US012469471B2

(12) United States Patent
Kyles et al.

(10) Patent No.: US 12,469,471 B2
(45) Date of Patent: Nov. 11, 2025

(54) PULSE WIDTH MODULATION FOR PHASE-MODULATING DISPLAY

(71) Applicant: Ian Kyles, West Linn, OR (US)

(72) Inventors: Ian Kyles, West Linn, OR (US); Howard V. Goetz, Tigard, OR (US)

( * ) Notice: Subject to any disclaimer, the term of this patent is extended or adjusted under 35 U.S.C. 154(b) by 0 days.

(21) Appl. No.: 18/440,675

(22) Filed: Feb. 13, 2024

(65) Prior Publication Data

US 2024/0296811 A1 Sep. 5, 2024

Related U.S. Application Data

(60) Provisional application No. 63/487,795, filed on Mar. 1, 2023.

(51) Int. Cl.
*G09G 3/36* (2006.01)

(52) U.S. Cl.
CPC ......... *G09G 3/3696* (2013.01); *G09G 3/3607* (2013.01); *G09G 2300/0857* (2013.01); *G09G 2310/027* (2013.01); *G09G 2310/0289* (2013.01)

(58) Field of Classification Search
CPC ............... G09G 3/3696; G09G 3/3607; G09G 2300/0857; G09G 2310/027; G09G 2310/0289
See application file for complete search history.

(56) References Cited

U.S. PATENT DOCUMENTS 7,847,771 B2 12/2010 Maruyama et al.
12,249,294 B2 3/2025 Sanford et al.
2002/0093472 A1 7/2002 Numao
2003/0103026 A1* 6/2003 Yamakawa .......... G09G 3/3629 345/87
2006/0256141 A1 11/2006 Maruyama et al.
2008/0231568 A1 9/2008 Chen et al.
2016/0077367 A1* 3/2016 Lo ....................... G02F 1/13306 349/25

(Continued)

FOREIGN PATENT DOCUMENTS

CN 107507557 A 12/2017
CN 116762122 A 9/2023

(Continued)

OTHER PUBLICATIONS

"Chinese Application Serial No. 202080107838.4, Voluntary Amendment filed Nov. 28, 2023".

(Continued)

*Primary Examiner* — Kenneth B Lee, Jr.
(74) *Attorney, Agent, or Firm* — Schwegman Lundberg & Woessner, P.A.

(57) ABSTRACT

A method is disclosed for controlling a liquid crystal pulse width modulated display. A repetition period includes A group periods, each including B modulation intervals, each modulation interval spanning H unit durations and, except for the final modulation interval of the repetition period, a remainder unit duration. A desired number N of unit duration pulses are distributed into H unit duration pulses for each modulation interval, with remainder desired pulses distributed among the remainder unit durations of the modulation intervals. A drive sequence is generated, including one or more repetitions of the repetition period.

20 Claims, 14 Drawing Sheets

(56) References Cited

U.S. PATENT DOCUMENTS

| | | | | |
|---|---|---|---|---|
| 2017/0330509 | A1 | 11/2017 | Cok et al. | |
| 2021/0256901 | A1* | 8/2021 | Hudson | G09G 3/3426 |
| 2023/0377532 | A1 | 11/2023 | Sanford et al. | |
| 2025/0182714 | A1 | 6/2025 | Sanford et al. | |

FOREIGN PATENT DOCUMENTS

| | | | |
|---|---|---|---|
| EP | 1091343 | A2 | 4/2001 |
| KR | 20020062218 | A | 7/2002 |
| KR | 102626220 | B1 | 1/2024 |
| KR | 102791203 | B1 | 3/2025 |
| TW | 202225791 | A | 7/2022 |
| WO | WO-2021141953 | A1 | 7/2021 |
| WO | WO-2022125089 | | 6/2022 |
| WO | WO-2024182618 | A1 | 9/2024 |

OTHER PUBLICATIONS

"European Application Serial No. 21702553.5, Communication Pursuant to Article 94(3) EPC mailed May 3, 2023", 14 pgs.

"International Application Serial No. PCT/US2020/064153, International Preliminary Report on Patentability mailed Jun. 22, 2023", 11 pgs.

"International Application Serial No. PCT/US2020/064153, International Search Report mailed Nov. 3, 2021", 4 pgs.

"International Application Serial No. PCT/US2020/064153, Written Opinion mailed Nov. 3, 2021", 9 pgs.

"International Application Serial No. PCT/US2021/012262, International Preliminary Report on Patentability mailed Jul. 2021, 22", 18 pgs.

"International Application Serial No. PCT/US2021/012262, International Search Report mailed Mar. 24, 2021", 3 pgs.

"International Application Serial No. PCT/US2021/012262, Written Opinion mailed Mar. 24, 2021", 16 pgs.

"Korean Application Serial No. 10-2022-7027158, Notice of Preliminary Rejection mailed Jul. 21, 2023", W/English Translation, 17 pgs.

"Korean Application Serial No. 10-2022-7027158, Office Action mailed Aug. 9, 2022", W/O English Translation, 2 pgs.

"U.S. Appl. No. 18/252,462, Examiner Interview Summary mailed Jul. 10, 2024", 2 pgs.

"U.S. Appl. No. 18/252,462, Examiner Interview Summary mailed Oct. 18, 2024", 2 pgs.

"U.S. Appl. No. 18/252,462, Final Office Action mailed Sep. 10, 2024", 12 pgs.

"U.S. Appl. No. 18/252,462, Non Final Office Action mailed Apr. 23, 2024", 11 pgs.

"U.S. Appl. No. 18/252,462, Response filed Jun. 18, 2024 to Non Final Office Action mailed Apr. 23, 2024", 9 pgs.

"U.S. Appl. No. 18/252,462, Response filed Oct. 24, 2024 to Final Office Action mailed Sep. 10, 2024", 8 pgs.

"International Application Serial No. PCT/US2024/017888, International Search Report mailed Jul. 8, 2024", 5 pgs.

"International Application Serial No. PCT/US2024/017888, Invitation to Pay Additional Fees mailed May 15, 2024", 11 pgs.

"International Application Serial No. PCT/US2024/017888, Written Opinion mailed Jul. 8, 2024", 13 pgs.

"Korean Application Serial No. 10-2023-7022746, Notice of Preliminary Rejection mailed May 22, 2024", w/ English Translation, 11 pgs.

"U.S. Appl. No. 19/045,348, Preliminary Amendment filed Feb. 5, 2025", 3 pgs.

"Taiwanese Application Serial No. 109144233, Response filed Jan. 22, 2025 to Office Action mailed Nov. 11, 2024", w/ current English claims, 60 pgs.

"European Application Serial No. 20849004.5, Communication Pursuant to Article 94(3) EPC mailed Apr. 23, 2025", 12 pgs.

"European Application Serial No. 20849004.5, Response to Communication Pursuant to Rules 161 and 162 EPC filed Oct. 5, 2023", 11 pgs.

"European Application Serial No. 21702553.5, Response filed May 16, 25 to Summons to Attend Oral Proceedings mailed Nov. 18, 2024", 70 pgs.

* cited by examiner

PULSE WIDTH MODULATION FOR PHASE-MODULATING DISPLAY

CROSS-REFERENCE TO RELATED APPLICATION

This patent application claims the benefit of U.S. Provisional Patent Application No. 63/487,795, filed Mar. 1, 2023, entitled "PULSE WIDTH MODULATION FOR PHASE-MODULATING DISPLAY", which is incorporated by reference herein in its entirety.

BACKGROUND

An objective of phase-modulation applications is to minimize the amount of phase ripple. Phase ripple blurs details of an image created by a phase-modulating display and is thus undesirable. This objective is particularly challenging for digitally-driven liquid-crystal displays (LCDs), because in operation these displays can only be written to one of two voltages; a drive voltage that corresponds to fully "on" (or minimum optical retardance) and a relaxation voltage that corresponds to fully "off" (or maximum optical retardance). Actual images require the ability to adjust the optical retardance, and thus the phase shift, over a continuous range between these limits. For digital displays, this is typically done by repeatedly writing a sequence of 1's and 0's to a pixel at a rate significantly faster than the rise time or fall time of the liquid crystal element of the pixel. The liquid crystal (LC) element responds to this alternating series of pulses as a root mean squared (RMS) average voltage determined by the duty cycle (i.e., the ratio or comparative relationship of drive voltage times to relaxation voltage times) of the applied voltage pulses.

This rapid alternation technique is capable of accurate phase modulation, but it does exhibit certain limitations. In particular, there is typically some residual ripple in the response of the liquid crystal element due to the rapidly alternating voltage waveform. The magnitude of this ripple is determined by the relationship (e.g., ratio) of the voltage pulse on/off times (i.e., drive voltage and relaxation voltage times) to the liquid crystal element response time. If the liquid crystal element response time is much slower than the on and off times of the voltage across the liquid crystal element, the amount of ripple will be small due to the averaging effect of the relatively slow liquid crystal element response. On the other hand, if the on and off times of the voltage waveform are longer and approach the response time of the liquid crystal element, the liquid crystal element will partially respond to each on and off pulse, and a fairly large optical ripple will result.

Thus, it may be beneficial to provide techniques for driving a phase-modulating display with a voltage waveform that reduces phase ripple.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
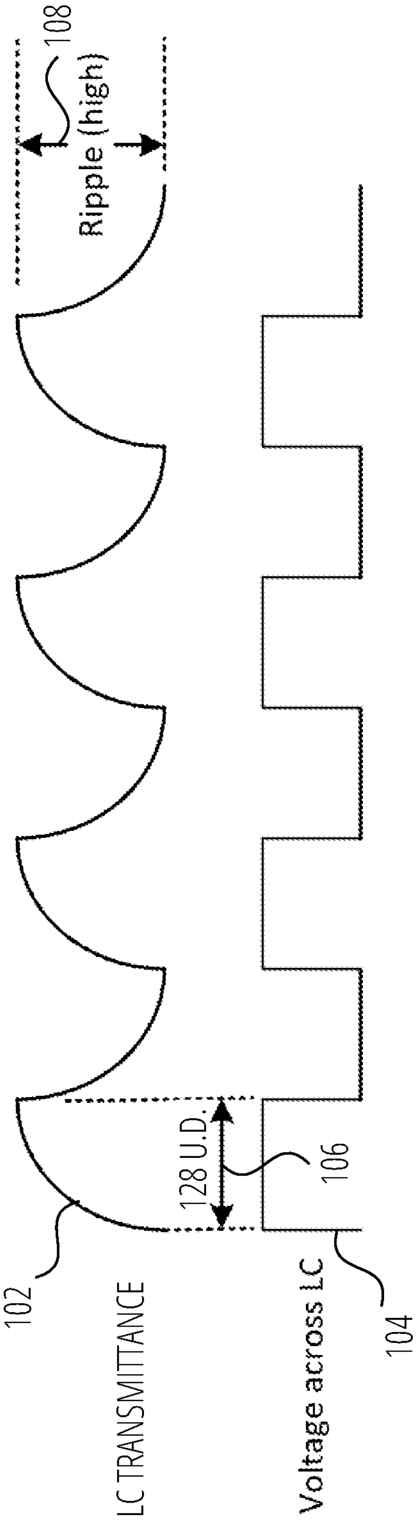
FIG. 1A illustrates a retardation response of a liquid crystal element to a voltage waveform having long alternating periods of drive voltage and relaxation voltage, illustrating a principle underlying some examples.

Examples are described herein that provide techniques for controlling a liquid crystal pulse width modulated display. As described above, digital PWM LCDs run the risk of phase ripple when the temporal widths of their pulses (i.e., drive voltage periods) and/or the temporal widths of the periods between pulses (i.e., relaxation voltage periods) is high in relation to the relaxation time of the LC elements of their pixels. However, control schemes for digital LCDs are limited in the number of bits that can be devoted to encoding drive sequences for controlling pulse widths due to allowable size, complexity and power dissipation within the system. Thus, there is a trade-off among three different factors: minimizing the bit length of a drive sequence, achieving a finely-graded scale for pixel grayscale values, and minimizing phase ripple. By evenly distributing pulses of slightly different widths over a time period in which a pixel of the display is driven, examples described herein may provide a binary drive sequence that decreases phase ripple while providing a high degree of grayscale granularity and using a relatively low number of bits in encoding the drive sequence.

As described above, a pixel of a display is driven by a drive sequence of voltage levels, wherein a high voltage level drives the pixel toward the fully "on" state (i.e., minimum retardance, maximum transmittance) and a low voltage drives the pixel toward the fully "off" state (i.e., maximum retardance, minimum transmittance). As used herein, the term "transmittance" refers to the degree to which a liquid crystal element propagates light without retarding it, i.e., transmittance has an inverse relationship to retardance.

As described above, the magnitude of the phase ripple of a phase-modulating display is determined by the relationship (e.g., ratio) of the voltage pulse on/off times (i.e., drive voltage and relaxation voltage times) to the liquid crystal element response time. Thus, to achieve low-ripple phase modulation, it is beneficial to make the alternating voltage pulses happen as quickly as possible, relative to the response time of the liquid-crystal.

It will be appreciated that there are many ways to structure sequences of 1's and 0's that average to the same value. For example, in an 8-bit system, there will be 256 time periods for these pulses to occupy (the elementary time periods of examples described herein are referred to as "unit durations", which in some examples may correspond to the shortest unit of time encoded by a binary sequence and corresponding to the least significant bit (LSB) of the binary sequence). Suppose that a grayscale value corresponding to an RMS value of 50% of the voltage range is desired, equivalent to 128 unit duration pulses out of a possible 256 unit durations, the grayscale value being encoded as a binary grayscale code value of 127. This grayscale value could be achieved by a voltage sequence of 128 "on" time periods (i.e., 128 unit time periods in which the drive voltage is applied), followed by 128 "off" time periods (i.e., 128 unit duration time periods in which the relaxation voltage is applied). Alternatively, the sequence could consist of 64 unit durations on, 64 off, 64 on, and 64 off. Or the sequence could be (8 on, 8 off) repeated 16 times. At the limit, the sequence could be (1 unit duration on, 1 unit duration off) repeated 128 times. It will be appreciated that the 128 on/128 off case will stay at each voltage for the longest time, resulting in the liquid crystal element having time to respond at least partially to each voltage, and thus resulting in maximum optical ripple at the expense of more toggling activity and hence more dynamic power dissipation. Conversely, the case with 128 repetitions of the 1 on/1 off case will give minimum time for the liquid crystal element to respond to individual voltage pulses, and thus the liquid crystal element will tend to follow the RMS average of the applied voltage, resulting in much lower phase ripple.

FIG. 1A qualitatively shows a voltage waveform and resulting liquid crystal element transmittance for the 128 on/128 off case in a typical display. Two waveforms are shown on a shared horizontal time scale: the LC transmittance 102 waveform shows the degree of transmittance (i.e., lack of retardance) of the liquid crystal element as a voltage waveform 104 is applied to the LC element. The pulse width 106 is relatively wide: 128 unit durations (abbreviated herein as "u.d."), out of a 256 unit duration period, i.e., each pulse is half the duration of the entire 256-unit duration period (four such periods being shown in FIG. 1A). Because 128 unit durations is long relative to the LC relaxation period, the phase ripple 108 is accordingly relatively high in this example, because the LC transmittance 102 oscillates dramatically before and after every pulse.

Figure 1B:
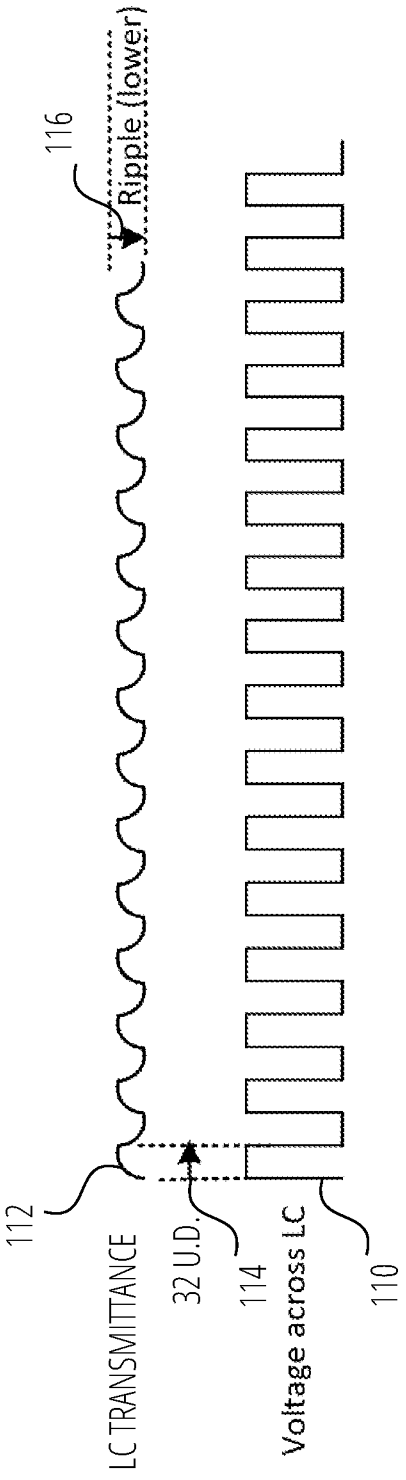
FIG. 1B illustrates a retardation response of a liquid crystal element to a voltage waveform having short alternating periods of drive voltage and relaxation voltage, illustrating a principle underlying some examples.

FIG. 1B shows the same data as FIG. 1A for a 32 on/32 off case. The LC transmittance 112 waveform shows the degree of transmittance of the liquid crystal element as the voltage waveform 110 is applied to the LC element. The pulse width 114 is relatively narrow: just 32 unit durations, out of a 256 unit duration period. Because 32 unit durations is short relative to the LC relaxation period, the phase ripple 116 is accordingly relatively low in this example, because the LC transmittance 112 only oscillates a small amount before and after every pulse.

It will be appreciated that very low-value and very high-value levels of phase-shift will tend to be problematic in PWM LCD systems. For the 8-bit system having repetition periods of 255 unit durations (e.g., an 8-bit encoding representing grayscale values between 0 and 255), a desired modulation code (e.g., binary grayscale code) of "2" would require a pulse sequence that in total was at the drive voltage for only 2 unit durations and was at relaxation voltage for the other 253 unit durations. Likewise, a desired modulation code of "253" would require a pulse sequence that in total was at drive voltage for 253 of the unit durations, and only at relaxation voltage for 2 unit durations. These cases are inherently very irregular, and in these cases the best that can be done is typically to spread out the modulation pulses as evenly as possible. In fact, this is a general objective in many types of pulse sequence: the distribution of on and off pulses must be as even as possible during each sequence in order to achieve the lowest possible ripple.

Figure 2A:
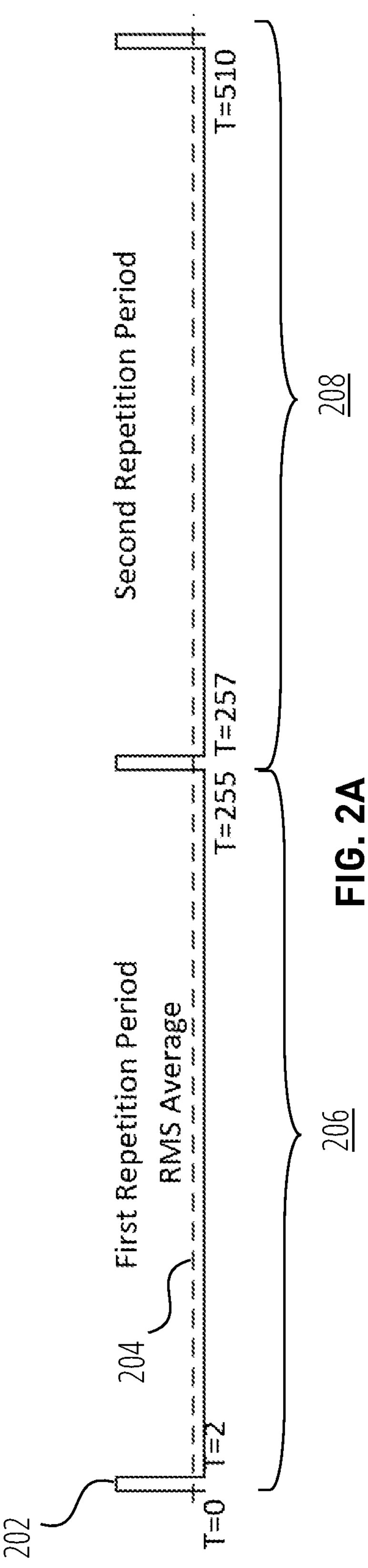
FIG. 2A illustrates a voltage waveform of predominantly relaxation voltage, illustrating a principle underlying some examples.

FIG. 2A shows an illustrative example of a drive sequence in which a very low grayscale value, shown here as a grayscale code value of 2 (out of a possible 255), is implemented using a conventional binary PWM scheme. The drive sequence drives a voltage waveform of predominantly relaxation voltage, interrupted only by a single short pulse 202 of two unit durations over the first repetition period 206 of 255 unit durations (t=0 to t=255). The second repetition period 208 begins with another short pulse of two unit durations (t=255 to t=257), and so on. These frames generate an RMS average 204 value of 2 out of a possible 255, corresponding to the desired grayscale value of 2.

Figure 2B:
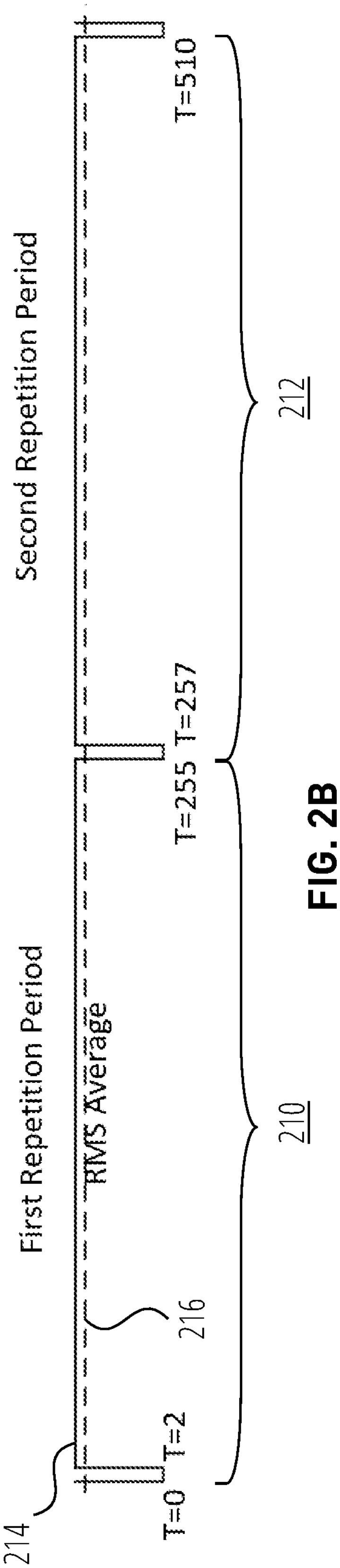
FIG. 2B illustrates a voltage waveform of predominantly drive voltage, illustrating a principle underlying some examples.

FIG. 2B shows another illustrative example of a drive sequence similar to FIG. 2A, but in which the other extreme is illustrated: in FIG. 2B, a very high grayscale value, shown here as a grayscale code value of 253 (out of a possible 255), is implemented using a conventional binary PWM scheme. The drive sequence drives a voltage waveform of predominantly drive voltage, consisting of a long pulse 214 that occupies 253 out of 255 unit durations of the first repetition period 210. The second repetition period 212 repeats this pattern. Each frame has an RMS average 216 of 253, corresponding to the desired grayscale value of 253.

As described above, however, there are typically conflicting requirements and trade-offs among different designs. Driving very fast pulse sequences to large arrays of pixels (such as are common in modern displays) can be electrically very challenging due to the extremely high data rates required. For example, a high-definition (HD) display will typically have about 2.2 million pixels, and writing a potentially different sequence of 1's and 0's to each of these pixels many times in a row (as in the above "1 on/1 off" case shown in FIG. 1B) over a given frame time (e.g., the time over which a video frame is displayed on the LCD) can be difficult or result in a high power dissipation. An alternative approach is to incorporate WM or DFM modulation hardware into each pixel, and configure this hardware to handle the modulation of the pixel based on a written multibit data word (i.e., a binary drive sequence). This approach must address the difficulty of designing pixel circuitry that can perform this function without being unduly complex: the amount of digital circuitry which must be incorporated into each pixel to achieve realistic performance goals can result in large pixel sizes and/or pixel pitches, and therefore large overall resulting display sizes, that are too large for their intended use.

Examples described herein, in reference to FIG. 3 through FIG. 11A, may provide techniques for creating drive sequences that are relatively simple to implement in pixel circuitry but which achieve near-optimum phase ripple results for a given minimum unit duration. In some examples, a 10-bit encoding is described for a drive sequence that can be processed by pixel circuitry to drive the voltage of a pixel of a PWM LCD. In other examples, the drive sequence implementation can be modified to achieve bit-depths that are larger or smaller than 10 bits.

Example Drive Sequence Generation Method

In some examples, a mixed-mode method can be used to generate the drive sequence for the pixel. In some examples, the drive sequence controls the transmittance of the liquid crystal of a pixel over the time in which the display shows a frame or, in the case of color sequential displays, a color sub-frame (called the "frame time"). Modern LCDs display frames at a refresh rate or frame rate of many frames per second, such as 30 Hz or 120 Hz. In color sequential displays, each frame may be displayed as a sequence of color sub-frames, such as three color sub-frames per frame (e.g., a 360 Hz color sub-frame rate (CSFR) for a RGB display at a frame rate of 120 Hz). The drive sequence is configured to maintain the desired grayscale value of the pixel over the frame time, e.g., either a grayscale value for the pixel as a whole over the duration of the entire frame, or a color-specific grayscale value over the duration of the color sub-frame for the specific color.

In the examples illustrated in FIG. 3 through FIG. 11A, the drive sequence consists of a repeating sequence of repetition periods encoded as a repeated binary sequence (referred to herein as a repetition sequence), optionally preceded by a pre-emphasis period (also called an "overdrive" period and potentially encoded as a binary overdrive duration value) and/or followed by a relaxation period. Each repetition period consists of 16 group periods, structured as described below. Each group period, in turn, consists of 8 modulation intervals, structured as described below. Each modulation interval corresponds to a pulse of variable width, with the widths of the pulses of the various modulation intervals of a repetition period varying from each other by, at most, one unit duration. In the described examples, each modulation interval consists of a pulse train of 0 to 7 unit interval pulses with potentially a 1 unit interval "remainder" pulse either added, or not, depending on the specific grayscale value desired.

By converting a grayscale value into a large number of relatively short-width pulses and reducing the variation between pulse widths, drive sequences generated according to some examples described herein may address the technical problem of reducing phase ripple in the image generated by the pixels of a PWM display, such as a PWM LCD, while also addressing the technical problem of encoding and decoding the large number of short-width pulses according to a simple 10-bit encoding and decoding scheme. This may improve the functioning of a display, such as a LCD, as well as improving the functioning of a computer or other digital logic driving the display, by enabling simple, low-complexity encoding and decoding of the drive sequence for each pixel while reducing phase ripple of the image generated by the display.

It will be appreciated that some examples may use a different number of group periods, a different number of modulation intervals, a different modulation interval duration, a different distribution of remainder bits, and/or a different bit encoding than the examples described herein while still potentially realizing one or more such benefits. For example, an alternative 10-bit encoding for the repetition period of the drive sequence could be used in some examples to encode a repetition period having 16 group periods, each having 4 modulation periods of 16 unit durations each (15 unit durations for the final modulation interval of the final group period).

Because each pulse train (driven over a modulation interval) has a width that differs from each other pulse train by at most 1 unit duration, the drive sequence has a short-term RMS voltage as close to being constant as is possible for a given unit duration. At the highest code values (e.g., grayscale value of 1020 out of a possible 1023), these durations will begin to merge with each other, giving the appearance of being longer pulses. This is unavoidable if the total available duration is to be utilized. At the limit, for a grayscale value of 1023, all of the pulses merge and the voltage is continuously high. Likewise, at a grayscale value of 0, the voltage value will be continuously low, as would be expected.

As noted above, the structure of the drive sequence for the repetition period is that of 16 repetitions of a group period, each group period encompassing a group of 8 modulation intervals. The pulses corresponding to the modulation intervals all have the same duration of 0 to 7 unit durations (called the main segment pulse duration, denoted H herein), plus in some cases a single additional "remainder" pulse of one unit duration. Determining the value of H and the distribution of remainder pulses may be performed, in some examples, according to a method 300 shown in the flowchart of FIG. 3.

Figure 3:
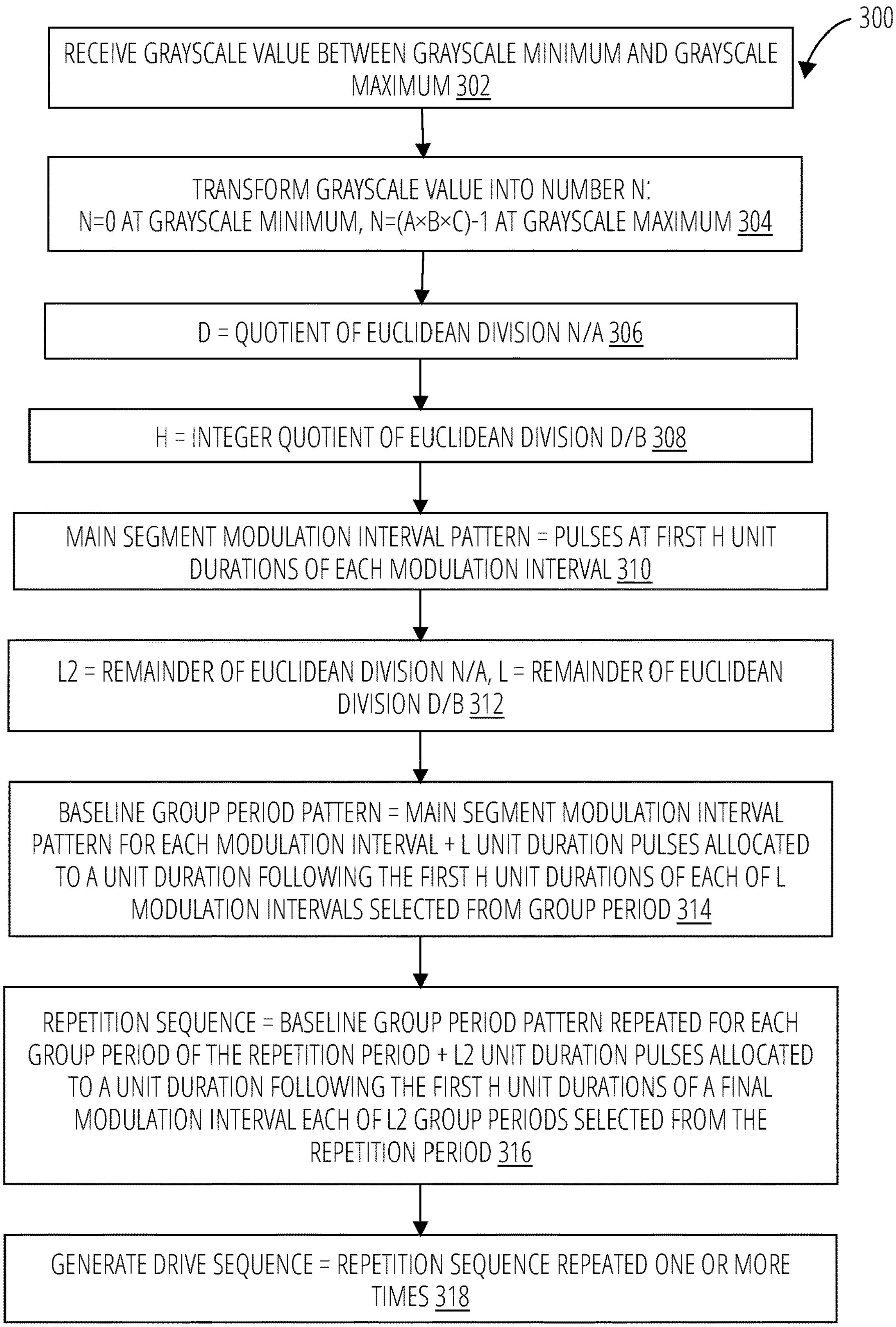
FIG. 3 is a flowchart showing operations of a method for controlling a liquid crystal pulse width modulated display, in accordance with some examples.

FIG. 3 illustrates an example method 300 for controlling a liquid crystal pulse width modulated display by generating a drive sequence. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes receiving a grayscale value between a grayscale minimum and a grayscale maximum at operation 302. The grayscale value may be on any scale, such as an integer from 0 to 255, or a real number value (e.g., represented as a floating point number encoding).

Figure 7:
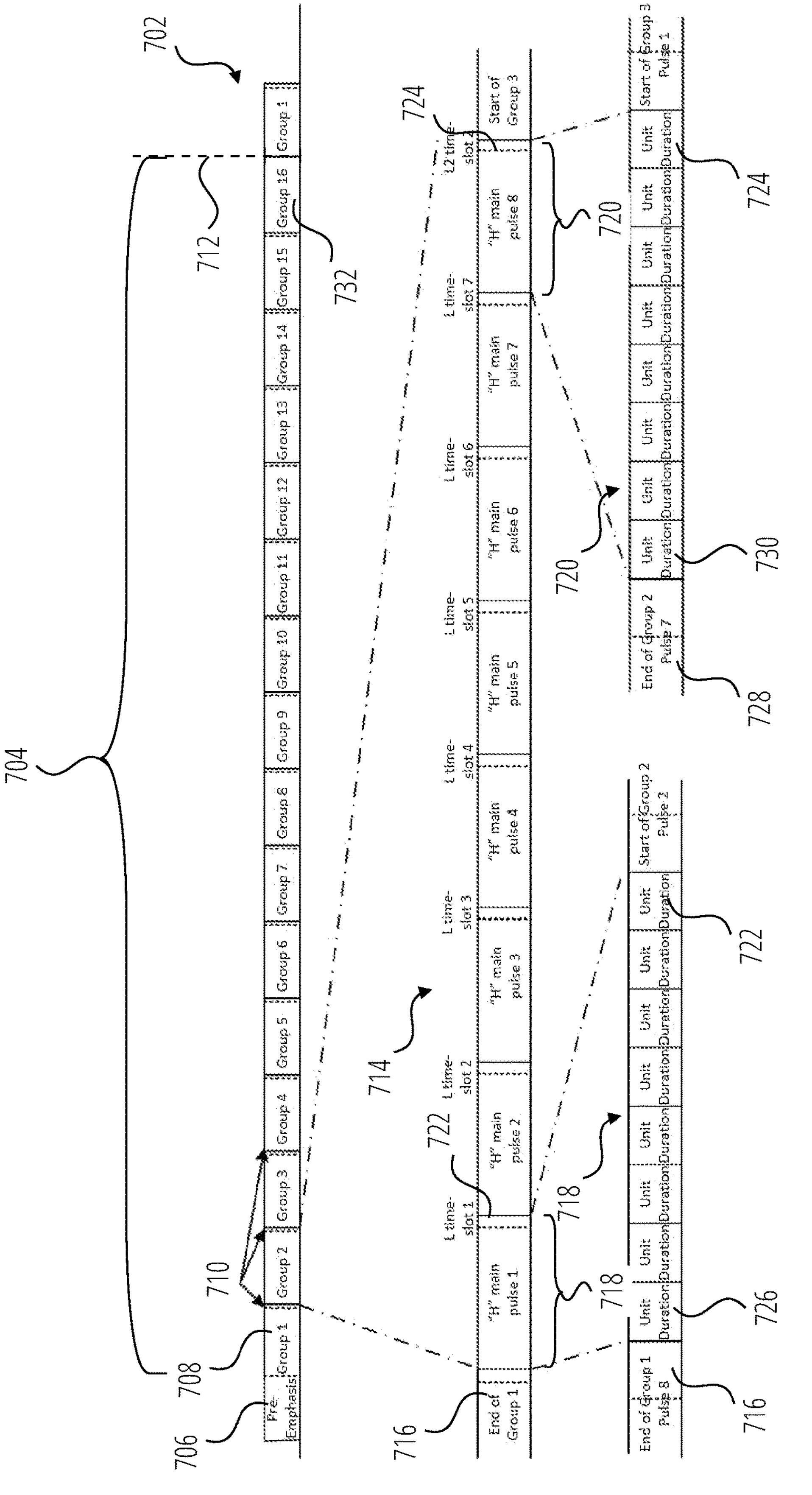
FIG. 7 illustrates a repetition period of a drive sequence showing expanded detailed view of a second group period and further expended detailed views of a first and eighth modulation intervals of the second group period, in accordance with some examples.

According to some examples, the method includes transforming the grayscale value into a number N representing the desired number of unit duration pulses in a repetition period of the drive sequence at operation 304. As described above, the repetition period consists of a first number A of group periods (e.g., A=16 in the illustrated examples), each group period consisting of a second number B of modulation intervals (e.g., B=8 in the illustrated examples), and each modulation interval comprising a third number (C−1) of unit durations (e.g., C=8 in the illustrated examples), followed by, for each modulation interval except a final modulation interval of a final group period, an additional unit duration, such that the repetition period spans ((A×B×C)−1) unit durations. A detailed illustration of this structure is shown in FIG. 7, described below.

The transformation of operation 304 is essentially a normalization of the grayscale value to the number of unit durations in the repetition period: thus, the output of this operation 304 is N=0 at the grayscale minimum, and N=(A×B×C)−1 at grayscale maximum. Thus, for example, in an example in which a repetition period spans 1023 unit durations, and N ranges from 0 to 1023, and in which A=16, B=8, and C=8, the grayscale value is normalized at operation 304 to a value between N=0 and N=1023.

According to some examples, the method includes determining a group period baseline number of pulses D equal to the integer quotient of the Euclidean division of N by A at operation 306. Thus, in the example above, if the normalized grayscale code results in a value of N=666, then D=N div A=666 div 16=41.

According to some examples, the method includes determining a modulation interval baseline number of pulses H equal to the integer quotient of the Euclidean division of D by B at operation 308. Thus, in the example above, H=D div B=41 div 8=5 remainder 1.

According to some examples, the method includes determining a main segment modulation interval pattern consisting of H unit duration pulses at the first H unit durations of each modulation interval at operation 310. Thus, in the example above, each 8-unit duration modulation interval beings with a main segment pulse of 5 unit durations. This may be followed by a relaxation voltage period of 3 unit durations, or, if a remainder pulse is added to this modulation period, a single additional unit duration pulse followed by a relaxation voltage period of 2 unit durations.

According to some examples, the method includes determining a repetition period remainder L2 equal to the integer remainder of the Euclidean division of N by A, and determining a group period remainder L equal to the integer remainder of the Euclidean division of D by B, at operation 312. Thus, in the example above, L2=N rem A=666 rem 16=10, and L=D rem B=41 rem 8=1.

It will be appreciated that, in some examples, the values of D, H, L and/or L2 can be determined at operations 306, 308, 310, and 312 using a relatively simply binary mapping operation, such as the example binary mapping shown in FIG. 4 and described below.

According to some examples, the method includes determining a baseline group period pattern at operation 314. The baseline group period pattern consists of the main segment modulation interval pattern applied to each modulation interval of the group period, and an additional L unit duration pulses allocated to a unit duration following the first H unit durations of each of L modulation intervals selected from the group period.

In some examples, the L modulation intervals are selected at operation 314 using a rule or lookup table that evenly distributes the L remainder pulses over a group period. An example of a lookup table for a case in which B=8 is shown below. The L modulation intervals selected from the eight sequential modulation intervals of each group period are shown in the lookup table:

| L Remainder | Add 1 unit duration remainder pulse to the main segment pulse trains in each of the following modulation intervals of each group period: |
|---|---|
| 0 | None |
| 1 | First |
| 2 | First, Fifth |
| 3 | First, Fourth, Seventh |
| 4 | First, Third, Fifth, Seventh |
| 5 | First, Second, Fourth, Fifth, Seventh |
| 6 | First, Second, Third, Fifth, Sixth, Seventh |
| 7 | First, Second, Third, Fourth, Fifth, Sixth, Seventh |

It will be appreciated from the L remainder lookup table above that an L remainder pulse is never added to the last (e.g., eighth) modulation interval of a group period. The final unit duration of the final modulation interval of each group period is reserved for handling the L2 remainder pulses, at operation 316 below.

According to some examples, the method includes determining a repetition sequence for the repetition period at operation 316. The repetition sequence consists of the baseline group period pattern repeated for each group period of the repetition period, and an additional L2 unit duration pulses allocated to a unit duration following the first H unit durations of a final modulation interval of each of L2 group periods selected from the repetition period.

In some examples, as with operation 314, the L2 modulation intervals are selected at operation 316 using a rule or lookup table that evenly distributes the L remainder pulses over a group period. An example of a lookup table for a case in which A=16 is shown below. The L2 group periods selected from the sixteen sequential group periods of the repetition period are shown in the lookup table below:

| L2 Remainder | Add 1 unit duration remainder pulse to the main segment pulse trains in the final modulation interval of each of the following group periods: |
|---|---|
| 0 | None |
| 1 | First |
| 2 | First, Ninth |
| 3 | First, Sixth, Eleventh |
| 4 | First, Fourth, Eighth, Twelfth |
| 5 | First, Fourth, Eighth, Eleventh, Fourteenth |

-continued

| L2 Remainder | Add 1 unit duration remainder pulse to the main segment pulse trains in the final modulation interval of each of the following group periods: |
|---|---|
| 6 | First, Fourth, Seventh, Ninth, Twelfth, Fifteenth |
| 7 | First, Third, Fifth, Eighth, Tenth, Twelfth, Fourteenth |
| 8 | First, Third, Fifth, Seventh, Ninth, Eleventh, Thirteenth, Fifteenth |
| 9 | First, Third, Fourth, Sixth, Eighth, Tenth, Twelfth, Thirteenth, Fifteenth |
| 10 | First, Third, Fourth, Sixth, Eighth, Ninth, Eleventh, Twelfth, Thirteenth, Fifteenth |
| 11 | First, Second, Fourth, Fifth, Sixth, Eighth, Ninth, Eleventh, Twelfth, Thirteenth, Fifteenth |
| 12 | First, Second, Third, Fifth, Sixth, Seventh, Ninth, Tenth, Eleventh, Twelfth, Fourteenth, Fifteenth |
| 13 | First, Second, Third, Fourth, Sixth, Seventh, Eighth, Ninth, Tenth, Twelfth, Thirteenth, Fourteenth, Fifteenth |
| 14 | First, Second, Third, Fourth, Fifth, Sixth, Seventh, Ninth, Tenth, Eleventh, Twelfth, Thirteenth, Fourteenth, Fifteenth |
| 15 | First, Second, Third, Fourth, Fifth, Sixth, Seventh, Eighth, Ninth, Tenth, Eleventh, Twelfth, Thirteenth, Fourteenth, Fifteenth |

It will be appreciated from the L2 lookup table above that no remainder is ever added to the final (e.g., eighth) modulation interval of the final (e.g., $16^{th}$) group period. In the example 10-bit encoding illustrated in the figures, this final unit duration of the repetition period is omitted from the repetition sequence, and the next repetition period begins immediately, although in some examples this final bit of the repetition sequence could be used to achieve higher bit-depths or for other purposes. However, in the examples illustrated herein, the omission of this final bit means that the 10-bit encoding of the repetition sequence can encode at most $(2^{10}-1)=1023$ unit durations of drive voltage (i.e., a unit duration pulse) or relaxation voltage (i.e., absence of a pulse).

Thus, in the ongoing example in which a repetition period spans 1023 unit durations, A=16, B=8, C=8, and N=666, the pulse widths for each pulse train of a given modulation interval can be computed as follows:

- Divide the normalized grayscale value N by 16, and keep only the integer part. For example, for N=666, dividing by 16 gives 41.63. Discarding the remainder yields 41.
- This means that each group period should include 41 unit duration pulses.
- Divide 41 by 8, and again keep only the integer part. In this case, 41 divided by 8 gives 5.13 unit durations per modulation interval. Discarding the remainder yields 5.
- This means that each modulation interval should include 5 unit duration pulses in its main segment. This value is denoted as H (e.g., H=5 in this example).
- H=5 times C=8 gives a total duration of 40 unit durations of pulses per group period, yielding a remainder of L=41−40=1 unit duration per group period. This value is denoted as L (e.g., L=1 in this example).
- According to the L remainder lookup table, a remainder pulse of 1 unit duration is added to the end of the main segment of the first modulation interval of each group period.
- This means that the durations of the 8 pulse trains in each group period (from first to last) will be 8, 7, 7, 7, 7, 7, 7, 7 unit durations in width.
- 41 unit durations of pulses per group period, times A=16, yields a remainder of L2=666−656=10 unit durations per repetition period. This value is denoted as L2 (e.g., L2=10 in this example).
- According to the L2 remainder lookup table, ten remainder pulses of 1 unit duration each are added to the end of the main segment of the final modulation interval of the final group period.
- This means that the durations of the 8 pulse trains in the final group period (from first to last) will be 8, 7, 7, 7, 7, 7, 7, 8 unit durations in width.

According to some examples, the method includes generating a drive sequence for controlling the liquid crystal pulse width modulated display, the drive sequence comprising the repetition sequence repeated one or more times at operation 318.

Example Pre-Emphasis Period

For code values less than the maximum grayscale value (e.g., less than 1023 in the 10-bit example described above), example method 300 described above may not be maximally efficient at the temporal beginning of a frame to be displayed on the display, because the LC must be brought as quickly as possible to the approximate desired phase value, and this may require 100% duty-cycle on-time (i.e., 100% of time spent at drive voltage) until the desired phase value is reached (assuming that the LC element starts the frame time at a transmittance value of 0). To address this further technical problem, some examples may include a relatively long duration of continuous drive voltage at the beginning of a frame (or sub-frame, as the case may be). This continuous drive voltage is referred to as a pre-emphasis pulse (or a pre-emphasis period or overdrive period). The use of a pre-emphasis period is analogous to techniques used in high-speed digital signal transmission.

Thus, in some examples, the drive sequence further comprises, prior to the repetition sequence repeated one or more times, a pre-emphasis period of continuous drive (e.g., drive voltage).

In some examples, the pre-emphasis period is of a different duration depending on the grayscale value—in general, the higher the desired grayscale value, the longer the pre-emphasis period will need to be. Determining the optimum duration of a pre-emphasis period may be an empirical process, and may be temperature-dependent in some examples. Thus, in some examples, the pre-emphasis period has a duration determined based at least in part on a temperature of the liquid crystal pulse width modulated display.

Once the end of the pre-emphasis period is reached, control of the display may switch to the method 300 outlined above, and the pre-emphasis period may not be repeated until the next image frame or color sub-frame begins.

Figure 4:
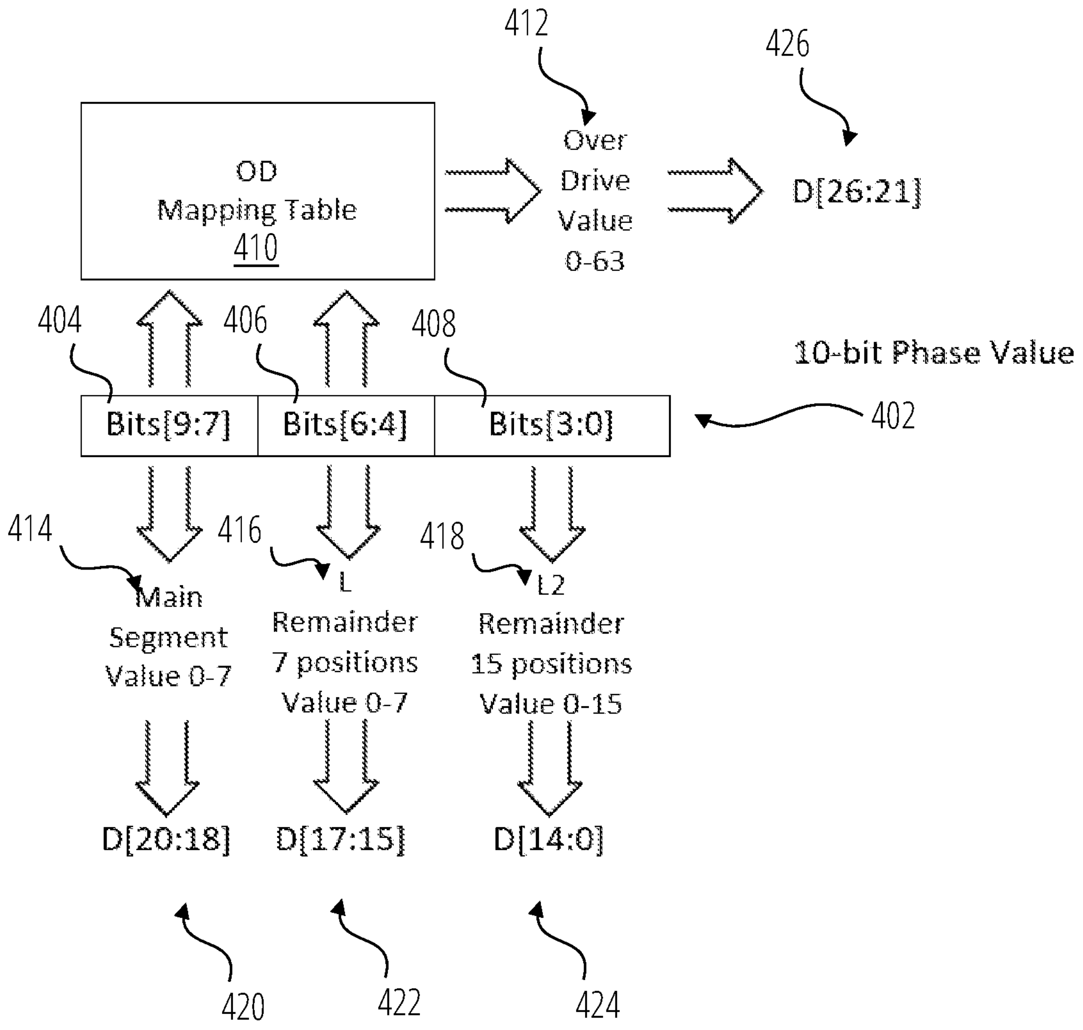
FIG. 4 illustrates a bit mapping scheme for a drive sequence having an overdrive pre-emphasis period, in accordance with some examples.

FIG. 4 shows a bit mapping scheme for an example drive sequence having an overdrive pre-emphasis period. The normalized grayscale value N generated at operation 304 is shown as a 10-bit phase value 402. The 10-bit phase value 402 is split into most significant bits 7 to 9 (404) corresponding to the main segment value 414 H, bits 4 to 6 (406) corresponding to L remainder value 416, and bits 0 to 3 (408) corresponding to L2 remainder value 418. These three values 414, 416, 418 are processed to generate the repetition sequence, encoded on a DATA bus for transmission to a pixel (described below with reference to FIG. 10), as DATA bits 0 to 14 (424), DATA bits 15 to 17 (422), and DATA bits 18 to 20 (420), respectively.

The bit mapping scheme also includes an overdrive mapping table 410 for mapping the values of the most significant bits (bits 7 to 9 (404) corresponding to the main segment value 414 H, and bits 4 to 6 (406) corresponding to L remainder value (416)) to an overdrive value 412 indicating the duration of the pre-emphasis period. The overdrive value 412 is encoded on the DATA bus as DATA bits 21 to 26 (426). Thus, in the illustrated example, the most significant bits of the 10-bit phase value 402 are used to determine the necessary duration of pre-emphasis, a principle described in greater detail with reference to FIG. 8A and FIG. 8B below.

Figures 5A, 5B, 5C:
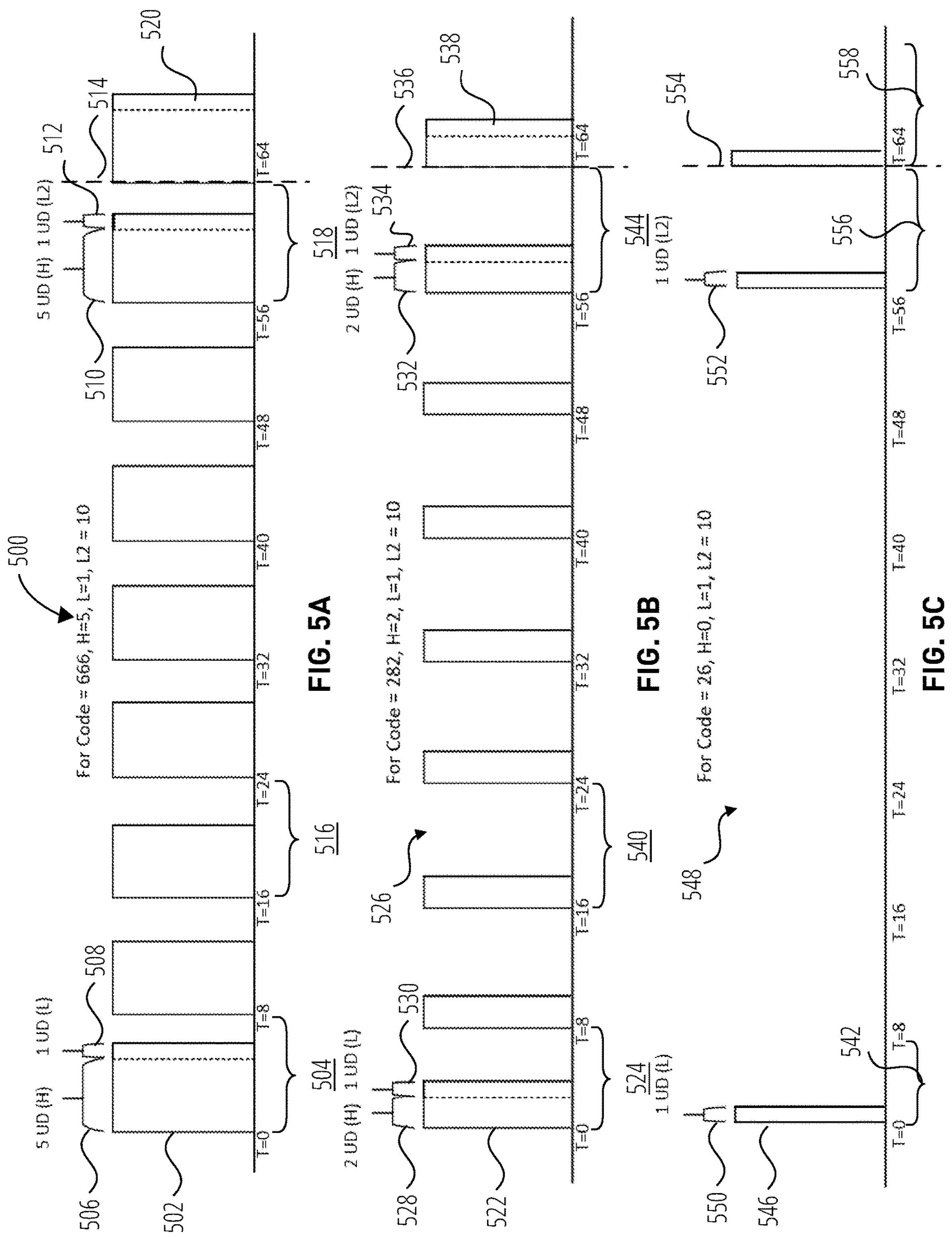
FIG. 5A illustrates a first group period of a repetition period encoding grayscale code 666, in accordance with some examples.
FIG. 5B illustrates a first group period of a repetition period encoding grayscale code 282, in accordance with some examples.
FIG. 5C illustrates a first group period of a repetition period encoding grayscale code 26, in accordance with some examples.

FIG. 5A through FIG. 5C show first group periods 500, 526, 548 of respective repetition periods, according to examples described herein. Each of the illustrated group periods 500, 526, 548 has the same values for the L and L2 remainders, but a different value for H. These group periods illustrate the distribution or allocation of L and L2 remainder bits in a first group period of a repetition period.

FIG. 5A shows a group period 500 in which H=5, L=1, and L2=10, corresponding to a repetition period in which the normalized grayscale code Nis 666. The group period 500 begins with the first modulation interval 504, in which a first modulation interval pattern 502 begins with a main segment pulse of H unit durations 506, followed by a pulse in the remainder unit duration 508 (due to the L lookup table allocating the one remainder pulse L=1 to the first modulation interval of each group period). The final two unit durations of the first modulation interval 504 are at relaxation voltage. Modulation intervals 2 through 7 (including the identified example of the third modulation interval 516) each has a main segment pulse of five unit durations, with no allocated remainder pulse. The eighth modulation interval 518, ending at the end of group period 514, begins with a pulse of H unit durations 510 followed by a pulse during the remainder unit duration 512, due to the final modulation interval of the first group period of the repetition period being allocated an L2 remainder pulse according to the L2=10 row of the L2 remainder lookup table. The subsequent (second, in this example) group period begins with a modulation interval identical to the first modulation period 500, with an L remainder pulse duration 520 allocated thereto.

FIG. 5B shows the differences in main segment duration from FIG. 5A if the normalized grayscale value Nis lowered to N=282. The lower value for N results in H falling from H=5 to H=2. It will be appreciated that the value of H is lower by 3, because the normalized grayscale value is (3×128) lower, but the L and L2 values are the same as in FIG. 5A, with the remainder pulses allocated to the same modulation intervals within the group period 526.

In this example, the group period 526 begins with the first modulation interval 524, in which a first modulation interval pattern 522 begins with a main segment pulse of H unit durations 528, followed by a pulse in the remainder unit duration (due to the L lookup table allocating the one remainder pulse L=1 to the first modulation interval of each group period). The final five unit durations of the first modulation interval 524 are at relaxation voltage. Modulation intervals 2 through 7 (including the identified example of the third modulation interval 540) each has a main segment pulse of two unit durations, with no allocated remainder pulse. The eighth modulation interval 544, ending at the end of group period 536, begins with a pulse of H unit durations 532 followed by a pulse during the remainder unit duration 534. The subsequent group period begins with a modulation interval identical to the first modulation group period 526, with an L remainder pulse remainder unit duration 538 allocated thereto.

FIG. 5C shows the differences in main segment duration from FIG. 5A and FIG. 5B if the normalized grayscale value N is lowered further to N=26. The lower value for N results in H falling further from H=2 to H=0. It will be appreciated that the value of His lower by 2 than in FIG. 5B, because the normalized grayscale value is (3×128) lower, but the L and L2 values are the same as in FIG. 5A and FIG. 5B, with the remainder pulses allocated to the same modulation intervals within the group period 548.

In this example, the group period 548 begins with the first modulation interval 542, in which a first modulation interval pattern 546 has a zero-width main segment pulse because H=0. Instead, the first modulation interval 542 begins with a pulse in the remainder unit duration 550. The final seven unit durations of the first modulation interval 542 are at relaxation voltage. Modulation intervals 2 through 7 each has a main segment pulse of zero unit durations, with no allocated remainder pulse. The eighth modulation interval 556, ending at the end of group period 554, begins with a pulse during the remainder unit duration 552. The subsequent group period begins with a modulation interval identical to the first modulation group period first modulation interval 542, beginning with an L remainder pulse remainder unit duration allocated thereto.

It will be appreciated that these described examples adhere to a number of rules:

In each group period, the set of modulation interval pulses always start at the same points in time, regardless of the pulse length or remainder value. In each group period, the first pulse starts at t=0 (relative to the start of the group period), the second pulse starts at t=C (e.g., t=8), the third pulse starts at t=2C (e.g., 16), and so on (with time measured in unit durations). The L remainder pulse in each case is added on directly at the end of the main segment pulse train.

If there are no main segment pulses in the group (H=0), the L remainder and L2 remainder pulses can still exist and start when the main segment pulse would have for a given modulation interval. FIG. 5C is illustrative: in this example, there are no main segment pulses because H=0. However according to the L remainder lookup table, an L remainder pulse is to be added to the first modulation interval in the group. Because there is no main segment pulse, this remainder pulse starts at t=0. According to the L2 remainder lookup table, an L2 remainder pulse is to be added to the last pulse in the group, as can be seen in FIG. 5C at t=56. This L2 remainder pulse would also be added to the $8^{th}$ pulse for the third, fourth, sixth, eighth, ninth, eleventh, twelfth, thirteenth, and fifteenth group periods.

For high code values with H=C−1 (e.g., H=7), modulation intervals (except the final modulation interval of a group period) with an L remainder added will merge with the beginning of the pulse of the next modulation interval.

Likewise, for any sequence in which H=C−1 (e.g., H=7), the pulse at the beginning of the next group period will merge with the pulse at the end of the eighth modulation interval in the $16^{th}$ group period. Examples are illustrated in FIG. 6A through FIG. 6C.

Figure 6A:
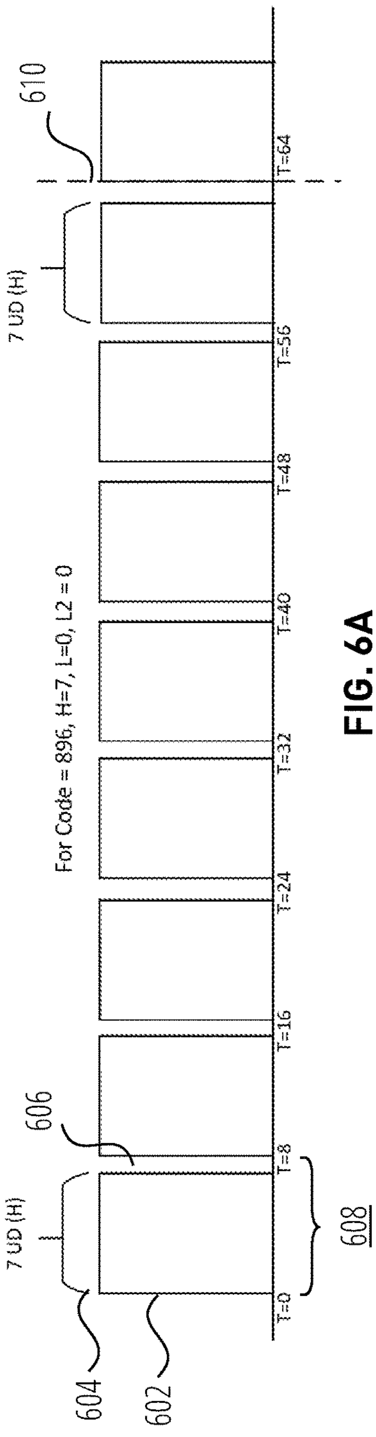
FIG. 6A illustrates a first group period of a repetition period encoding grayscale code 896, in accordance with some examples.

FIG. 6A shows a drive sequence for normalized grayscale code 896. In this example, H=7, L=0, and L2=0. All main segment pulses are therefore 7 unit durations long, and there are no remainder pulses. The gaps between the pulses are therefore all 1 unit duration long. The first modulation interval 608 includes first modulation interval pattern 602 beginning with a main segment pulse of H unit durations 604, followed by a remainder unit duration 606 gap (at relaxation voltage). This pattern repeats for each modulation interval until the end of first group period 610.

Figure 6B:
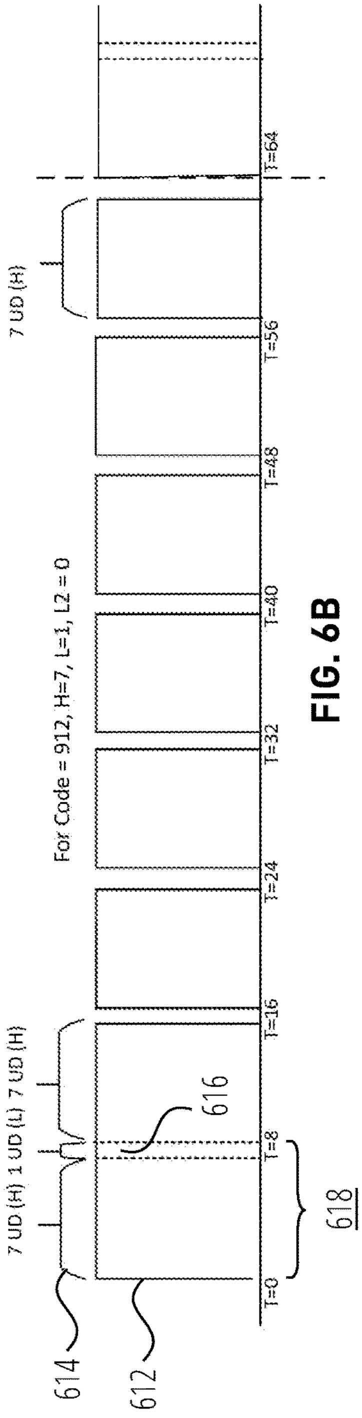
FIG. 6B illustrates a first group period of a repetition period encoding grayscale code 912, in accordance with some examples.

FIG. 6B shows a drive sequence for normalized grayscale code 1112. In this example, H=7, L=1, and L2=0. The L remainder lookup table entry for L=1 requires that a remainder pulse be added to the first modulation interval of each group period. The added remainder pulse at remainder unit duration 616 causes the pulse of the first modulation interval 618 (including main segment pulse of H unit durations 614 and the remainder pulse at remainder unit duration 616) and the pulse of the second modulation interval to merge together, as noted above.

Figure 6C:
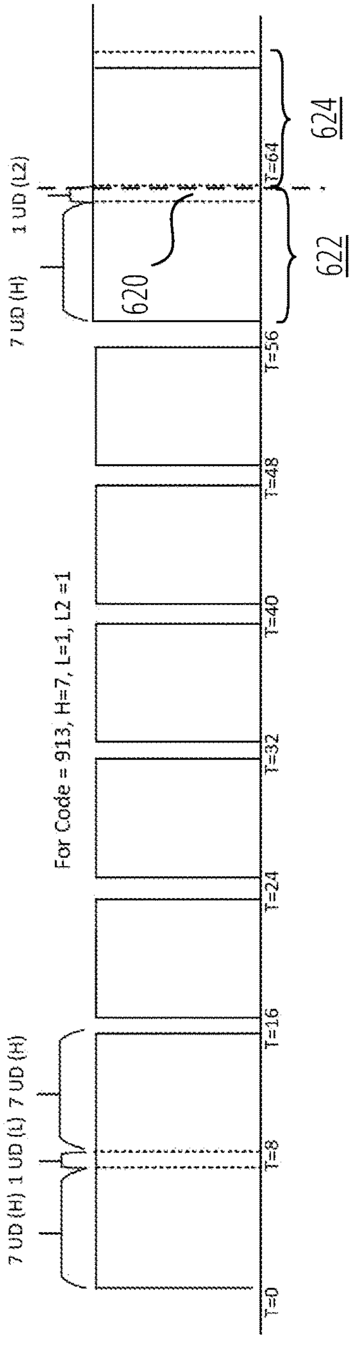
FIG. 6C illustrates a first group period of a repetition period encoding grayscale code 913, in accordance with some examples.

FIG. 6C shows a drive sequence for normalized grayscale code 913, one more than FIG. 6B. In this example, H=7, L=1, and L2=1. The L2 remainder lookup table entry for L2=1 requires that an L2 remainder pulse be added to the last modulation interval of the first group period of the repetition period. The added L2 remainder pulse at remainder unit duration 620 causes the pulse of the eighth modulation interval 622 and the pulse of the first modulation interval of the second group period 624 to merge together, as noted above.

It will be appreciated that these described examples adhere to a number of additional rules:

- Each of the A group periods (e.g., A=16) will always start at the same point in time. These will be at times t=0, t=64, t=128, etc., in the illustrated examples (in unit durations).
- The total duration for one repetition period is 1023 unit durations. For a unit duration of 0.25 μs, the repetition period is 255.75 μs. This is substantially less than a typical LC rise time, so in some examples it may be necessary to repeat the repetition sequence several times to achieve a stable phase modulation level.

FIG. 7 shows, in the top row, a drive sequence 702 consisting of a pre-emphasis period 706 followed by multiple repetitions of a repetition period 704, according to the example 10-bit encoding described above. The repetition period 704 begins with a first group period 708 and ends with a 16th group period 732. The end of the 16th group period 732, coinciding with the end of repetition period 712, notably does not include a remainder bit/remainder unit duration. However, each other group period includes an L2 remainder pulse duration 710 in its final unit duration/bit position.

A detailed expanded view of second group period 714 is shown in the second row. A first modulation interval 718 of second group period 714 follows the end of first group period 716. The final unit duration of first modulation interval 718 is an L remainder unit duration 722. The eighth modulation interval 720 ends with an L2 remainder unit duration 724 instead, because it is the last modulation interval in the group period.

Detailed expanded views of first modulation interval 718 and eighth modulation interval 720 are shown in the third row. After the end of first group period 716, the first modulation interval 718 begins with first unit duration 726, and it ends with the L remainder unit duration 722. The L remainder unit duration 722 begins with first unit duration 730 and ends with L2 remainder unit duration 724.

It will be appreciated that this drive sequence represents a relatively high grayscale value in which H=C−1, because the L and L2 remainder slots are at the final unit duration position in each modulation interval (as in FIG. 6A-FIG. 6C).

Figure 8A:
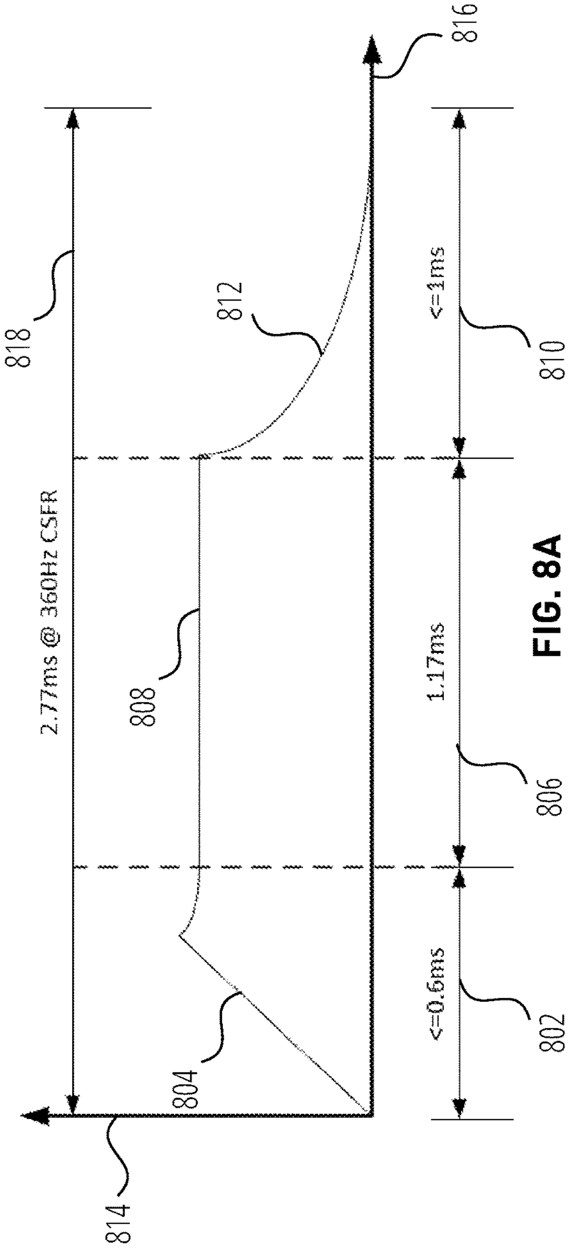
FIG. 8A illustrates a graph of liquid crystal retardation against time for a liquid crystal element of a pixel driven by a drive sequence in accordance with some examples.

FIG. 8A shows a graph of LC transmittance 814 against time 816 for an example drive sequence over an operating period 818, including a pre-emphasis period 802, a steady-state repetition period 806, and a relaxation period 810. For the reasons described above, pre-emphasis may be desirable in some examples at the beginning of a frame or sub-frame time of the pixel being driven by the drive sequence. In some examples, a pre-emphasis period may be included in the drive sequence and encoded as a pre-emphasis period duration (also called a binary overdrive duration value herein). The duration of the pre-emphasis period in this example is shown as being less than or equal to 0.6 ms in the context of a 2.77 ms image frame time at a field-sequential color sub-frame rate (CSFR, i.e. the rate of alternating color illumination periods) of 360 Hz, but in other examples this pre-emphasis period duration may be higher or lower. Similarly, the duration of the steady-state 808 is shown as 1.17 ms, and the duration of the relaxation period 810 is shown as less than or equal to 1 ms, but these times may also be varied in different examples.

During the pre-emphasis period 802, the LC transmittance 814 increases in accordance with a linear ramp 804 as 100% drive voltage is applied. During the repetition period 806, a steady-state 808 grayscale value is maintained, in accordance with method 300 described above. During the relaxation period 810, in preparation for the next frame or sub-frame, the LC exhibits LC relaxation 812 during a period of 100% relaxation voltage.

Figure 8B:
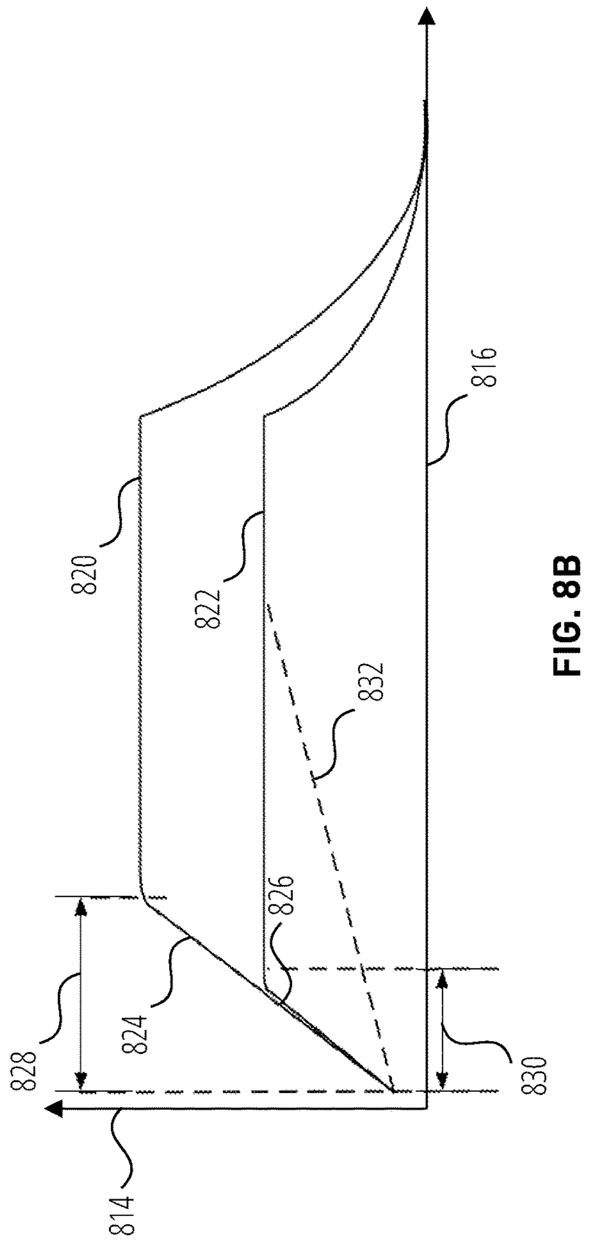
FIG. 8B illustrates a graph of liquid crystal retardation against time for a liquid crystal element of a pixel driven by a drive sequence at a high grayscale code value with pre-emphasis, at a low grayscale code with pre-emphasis, and at a low grayscale code without pre-emphasis, in accordance with some examples.

FIG. 8B is similar to FIG. 8A, but shows superimposed traces of LC transmittance 814 against time 816 for a low-code (e.g., low grayscale value) drive sequence and a high-code (e.g., high grayscale value) drive sequence. The high code LC transmittance waveform 820 begins with a high code pre-emphasis linear ramp 824 during the high code pre-emphasis period 828, which is longer than the low code pre-emphasis period 830 of the low code LC transmittance waveform 822 in which a low code pre-emphasis linear ramp 826 brings the LC transmittance value up to the steady-state low-code grayscale value. However, in the absence of a pre-emphasis period, the ramp without pre-emphasis 832 to the low-code grayscale value would actually be longer than the high code pre-emphasis period 828; thus, pre-emphasis may be necessary in some examples to avoid low-code grayscale values from taking longer than high-code grayscale values to achieve equilibrium, potentially missing the timing requirements for an image frame or color sub-frame.

Figure 9:
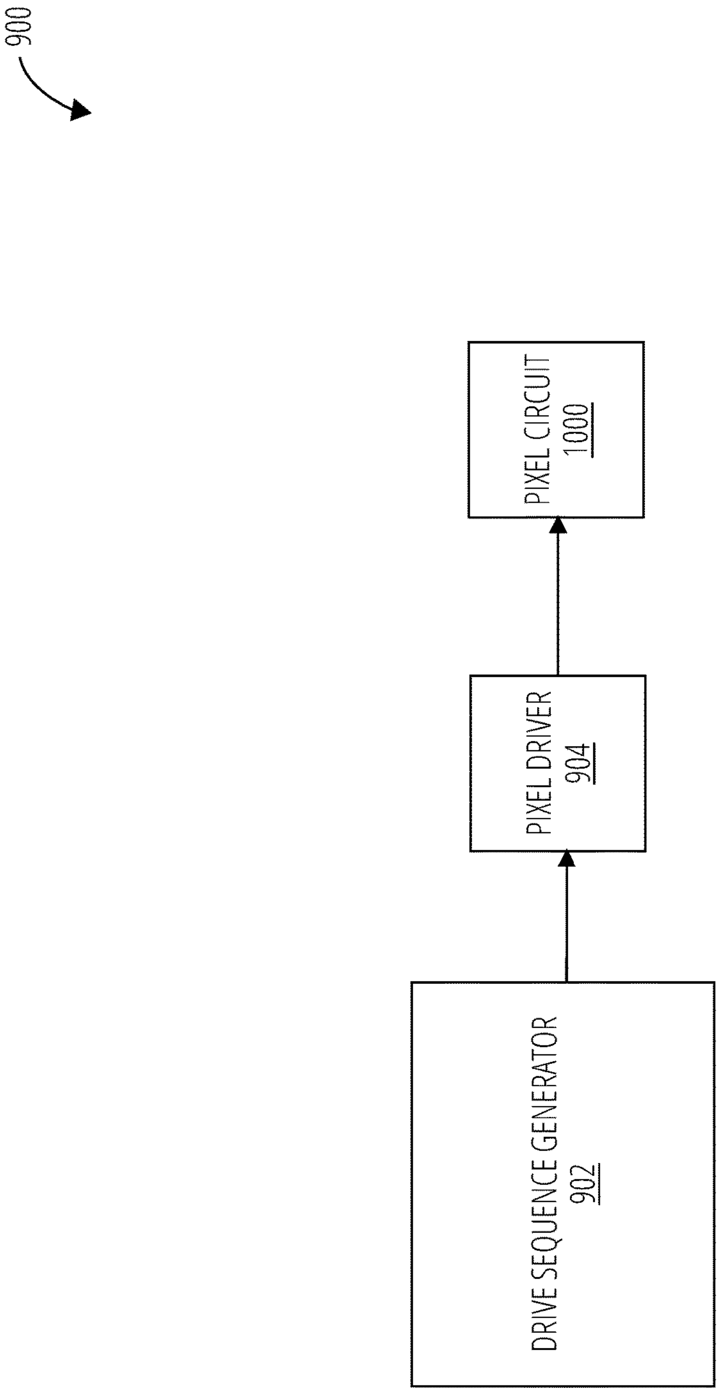
FIG. 9 illustrates a block diagram of a system for generating a drive sequence and driving a pixel, in accordance with some examples.

FIG. 9 shows a simplified block diagram of a system 900 showing how example drive sequences described herein may be generated and used to drive pixels of a display. The system 900 comprises a drive sequence generator 902 for generating a drive sequence according to method 300, a pixel driver 904 configured to drive a pixel of the liquid crystal pulse width modulated display with the drive sequence, and a pixel circuit 1000 as described in further detail below with reference to FIG. 10.

Figure 10:
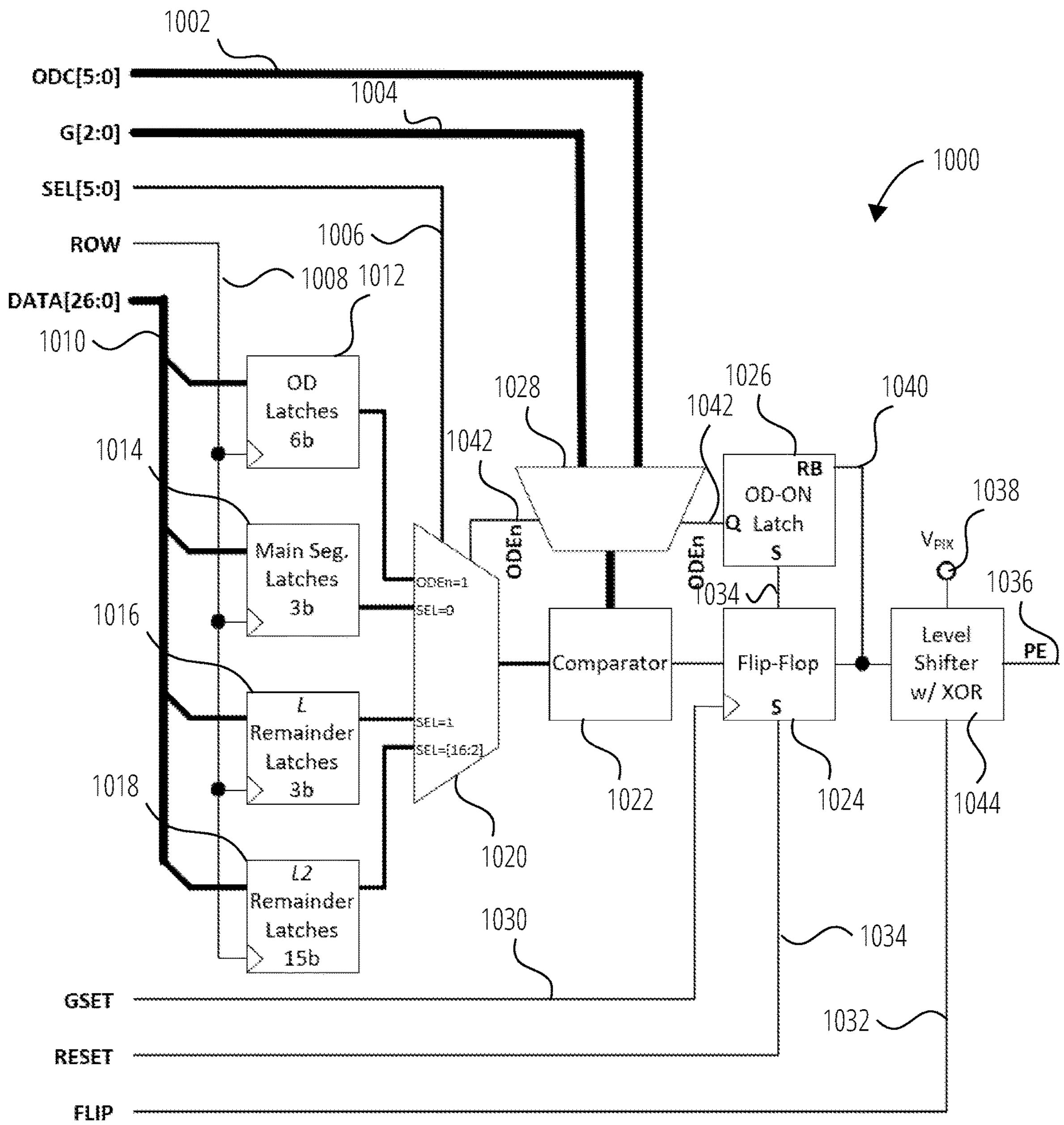
FIG. 10 illustrates a pixel circuit for driving a liquid crystal element of a pixel according to a received drive sequence, in accordance with some examples.

FIG. 10 shows a pixel circuit 1000. In some examples, the pixel circuit 1000 is a component of an array of the pixels of a liquid crystal display. The pixel circuit 1000 contains memory for buffering the bits of a DATA bus carrying an encoding of the drive sequence (e.g., encoded as described above with reference to the bit mapping of FIG. 4), and logic for driving a pixel voltage according to the decoded drive sequence.

As shown, the pixel circuit 1000 includes a pixel electrode 1036 containing a mirror element to reflect incoming light and drive a time-varying voltage across a liquid crystal element between the pixel electrode 1036 and the common electrode 1038 on the cover glass of the display. A level shifter circuit 1044 converts internal logic voltages to a higher voltage suitable for driving the liquid crystal element, and may in some examples contain an XOR logic function for inverting the sense of the pixel electrode 1036 when inverting the sense of the common electrode 1038 voltage as controlled by the FLIP signal 1032. A flip-flop 1024 stores and holds the pixel electrode 1036 voltage value for one cycle of the GSET signal 1030. The flip-flop 1024 may be reset by the RESET signal 1034. An OD-ON latch 1026 stores the ON/OFF state 1042 of an overdrive function. A first multiplexer 1028 is controlled by the output of the OD-ON latch 1026 to select between an ODC signal carried on the overdrive count (ODC) bus 1002 and a global (G) signal carried on the global counter (G) bus 1004 as a first operand of a comparator function 1022. A second multiplexer 1020 is controlled by the SEL signal 1006 to select the second operand of the comparator function 1022. A series of storage latches, shown as overdrive latches 1012, main segment latches 1014, L remainder latches 1016, and L2 remainder latches 1018, cache encoded binary values representing the drive sequence, which are propagated to drive the pixel electrode 1036. The bit lengths and bit positions shown in FIG. 10 correspond to an example implementation of the 10-bit encoding of the drive sequence described above. The values shown on the first multiplexer 1028 indicate, in the illustrated example, which latch values are propagated as the output of the first multiplexer 1028: if the ON/OFF state 1042 (shown as "overdrive enable" signal ODEn) is set to an "on" value (e.g., ODEn=1), the values of the overdrive latches 1012 are propagated in turn. Otherwise, if the pixel circuit 1000 is not in overdrive mode (i.e., not in the pre-emphasis period), then the value of the SEL signal 1006 determines the output of the first multiplexer 1028: if SEL=0, then the main segment latches 1014 values are propagated; if SEL=1, then the L remainder latches 1016 values are propagated; and if SEL=2 to 16, then each of the L2 remainder latches 1018 values is propagated.

Figure 11A:
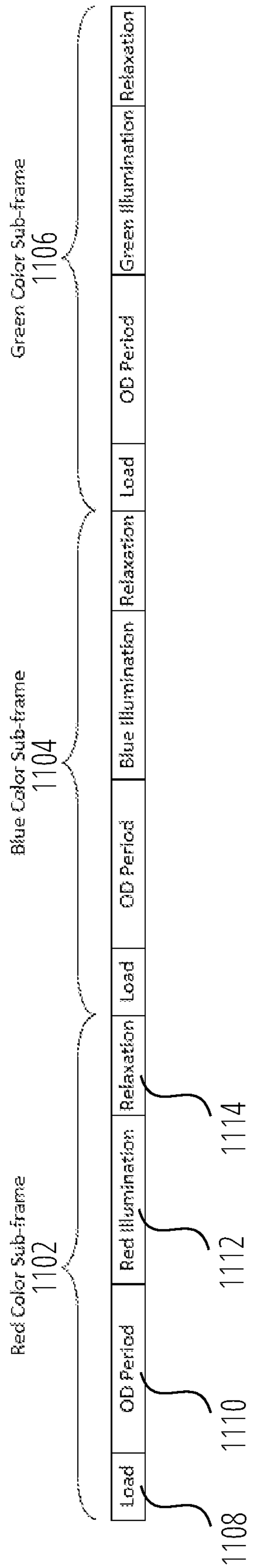
FIG. 11A illustrates a timing diagram of an example image frame of a pixel of a color sequential display, in accordance with some examples.

FIG. 11A is a timing diagram of an example image frame time of a pixel of a color sequential display. The frame time includes three color sub-frames: a red color sub-frame 1102, a blue color sub-frame 1104, and a green color sub-frame 1106. Each color sub-frame 1102, 1104, 1106 is divided into several consecutive periods: a load period 1108 in which the grayscale value is received and processed by the pixel circuit 1000, a pre-emphasis period 1110 (shown as an "OD period", i.e. over drive period), a steady-state illumination period 1112 (e.g., a red, blue, or green illumination period), and a relaxation period 1114. In some examples, the pre-emphasis period 1110, steady-state illumination period 1112, and relaxation period 1114 may be as described above in the pre-emphasis period 802, repetition period 806 (corresponding to steady-state illumination period 1112), and relaxation period 810 of FIG. 8A.

Figure 11B:
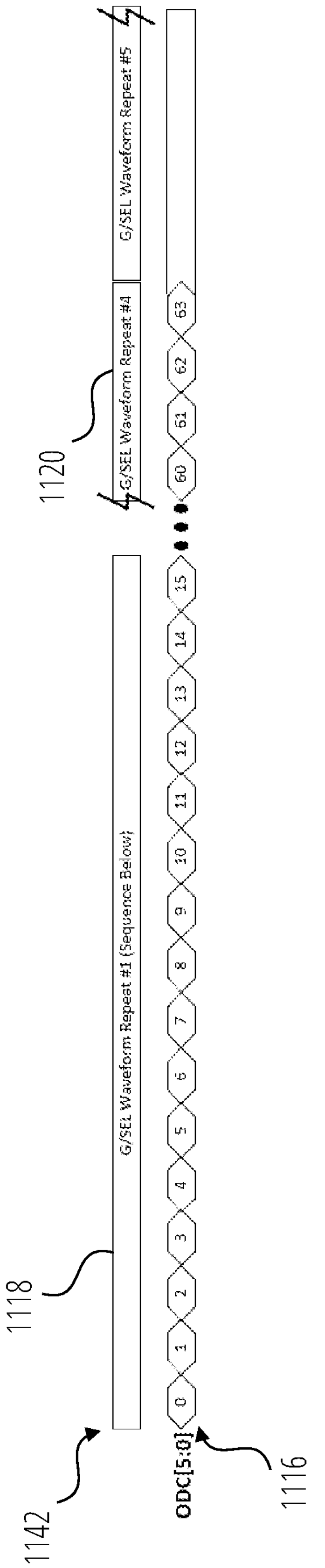
FIG. 11B illustrates a timing diagram of example ODC, G, and SEL signals of the pixel circuit 1000 of FIG. 10.

FIG. 11B shows a timing diagram of an example overdrive count (ODC) bus 1002 signal 1116 aligned with a G/SEL waveform 1142 formed based on the global counter (G) bus 1004 signal and the SEL signal 1006 of the pixel circuit 1000 of FIG. 10 during the pre-emphasis period 1110. An example of a G/SEL waveform 1142 is illustrated and described below with reference to FIG. 11D.

During the pre-emphasis period 1110, the operation of the pixel circuit 1000 proceeds as follows: data to be written to the storage latches 1012, 1014, 1016, 1018 is provided on the DATA bus 1010, and the ROW signal 1008 is strobed to write the DATA bus 1010 values to the storage latches 1012, 1014, 1016, 1018. The RESET signal 1034 is pulsed to set the pixel electrode 1036 voltage value high, and also to set the OD-ON latch 1026 to put the pixel circuit 1000 into overdrive mode. The GSET signal 1030 begins toggling to act as a clock signal for the flip-flop 1024. During the subsequent pre-emphasis period, the ODC bus signal 1116 is being compared to the value in the overdrive latches 1012, and when the values are equal, the comparator function 1022 registers a match, which is clocked into the flip-flop 1024. When the output of the flip-flop 1024 changes, the OD-ON latch 1026 will be reset, and the first multiplexer 1028 will select the G bus 1004 as the first operand for the comparator function 1022 henceforth. This marks the end of the pre-emphasis period and the beginning of the first repetition period for maintaining the steady-state grayscale value.

Thus, the ODC bus signal 1116 is considered a timer signal for the overdrive state, and is compared to the values of the overdrive latches 1012 to determine the ending time of the pre-emphasis period. In the illustrated example, the ODC bus signal 1116 encodes a duration of the pre-emphasis period from 0 to 63 group periods, and each G/SEL waveform period (e.g., 1118) corresponds to a repetition period. Thus, the 64 group periods over which the pre-emphasis period can extend (0 to 63) correspond to the first repetition period 1118 through a fourth repetition period 1120. However, it will be appreciated that the range of durations of the pre-emphasis period encoded in the OD bits stored in the overdrive latches 1012 can be configured in various examples to cover any suitable range of durations based on factors such as the properties of the liquid crystal element.

Figure 11C:
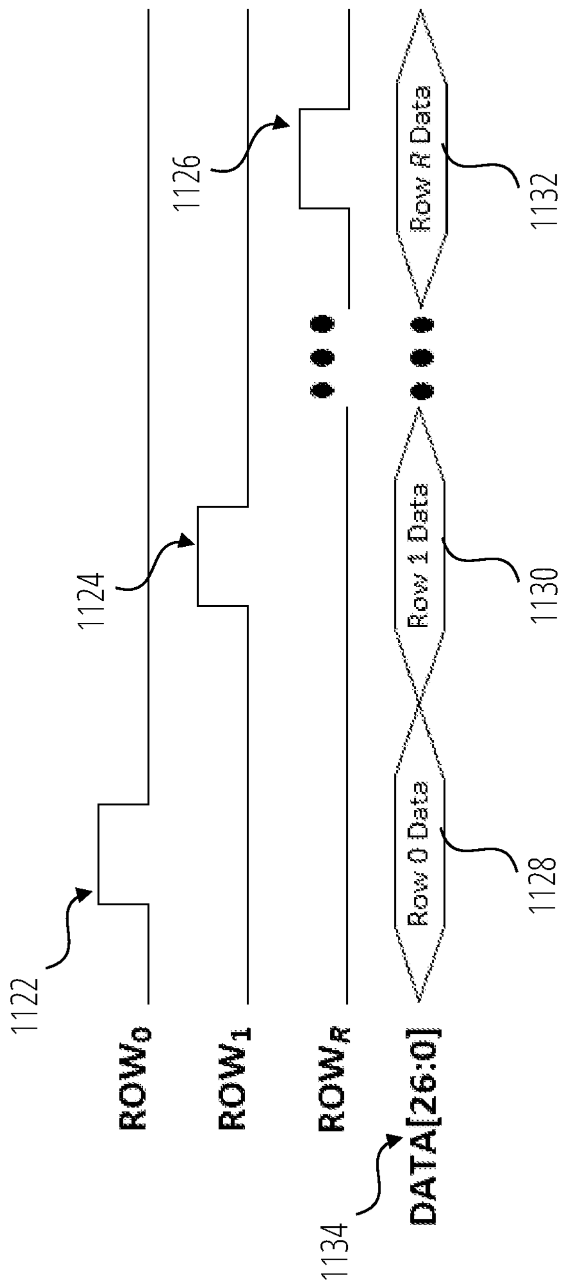
FIG. 11C illustrates a timing diagram of example ROW and DATA signals controlling a column of pixels implemented using the pixel circuit 1000 of FIG. 10.

FIG. 11C shows a timing diagram of example ROW and DATA signals controlling a column of pixels, as implemented using the pixel circuit 1000 of FIG. 10, during the steady-state illumination period 1112.

As described above, before or at the beginning of the pre-emphasis period (e.g., during the load period 1108), the data to be written to the storage latches 1012, 1014, 1016, 1018 is provided on the DATA bus 1010, and the ROW signal 1008 is strobed to write the DATA bus 1010 values to the storage latches 1012, 1014, 1016, 1018. Thus, as shown in FIG. 11C, the values 1128 of the DATA bus signal 1134 during a first pulse 1122 of the ROW signal encode the values for the storage latches for displaying row 0, the values 1130 of the DATA bus signal 1134 during a second pulse 1124 of the ROW signal encode the values for the storage latches for displaying row 1, and so on through the values 1132 of the DATA bus signal 1134 during an $R^{th}$ pulse 1126 (wherein the number of rows displayed in the frame=R+1) of the ROW signal encode the values for the storage latches for displaying row R.

Figure 11D:
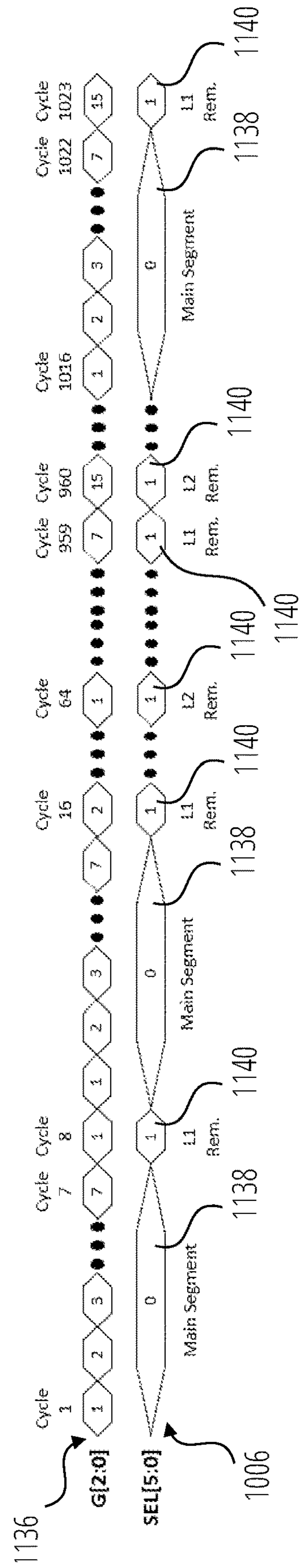
FIG. 11D illustrates a timing diagram of example G and SEL signals during an example repetition period for the pixel circuit 1000 of FIG. 10.

FIG. 11D shows a timing diagram of example G and SEL signals during an example repetition period for the pixel circuit 1000 of FIG. 10.

During the repetition periods spanning the steady-state illumination period 1112, different iterations of the repetition period will be realized, according to the previously described method 300. During the main segment 1138 pulses of each modulation interval, the main segment latches 1014 are selected as the first operand of the comparator function 1022 along with the global signal 1136 carried by the G bus 1004 as the second operand. Global signal 1136 values are periodically updated, and the GSET signal 1030 is pulsed to clock in the comparator function 1022 output. When the comparator function 1022 sees a match between the G bus 1004 and the storage latch 1012, 1014, 1016, 1018 values, the output state of the comparator function 1022 changes, thereby forming the width of the pulse of the modulation interval. During each of the remainder unit durations 1140, the SEL signal 1006 determines which latch or latches are used as operands (e.g., according to the values shown on the first multiplexer 1028 in FIG. 10). The pixel circuit 1000 then continues to operate in a similar fashion, comparing either 2 bits or 1 bit from the G bus 1004 to the latch contents to produce a pulse (or no pulse) at each unit duration, per the previously described method 300.

CONCLUSION

As described above, examples described herein may address one or more technical problems associated with pulse width modulated displays. By converting a grayscale value into a large number of relatively short-width pulses and reducing the variation between pulse widths, some examples described herein may address the technical problem of reducing phase ripple in the image generated by the pixels of a PWM display, such as a PWM LCD, while also addressing the technical problem of encoding and decoding the large number of short-width pulses according to a simple 10-bit encoding and decoding scheme. This may improve the functioning of a display, such as a LCD, as well as improving the functioning of a computer or other digital logic driving the display, by enabling simple, low-complexity encoding and decoding of the drive sequence for each pixel while reducing phase ripple of the image generated by the display.

Furthermore, some examples may attempt to address the technical problem of bringing the liquid crystal element of a pixel to the steady-state phase value as quickly as possible at the beginning of a frame or sub-frame, by providing a pre-emphasis period at the beginning of a drive sequence. Some examples herein may encode the pre-emphasis period in a binary format efficiently decodable by pixel circuitry or other logic used to drive the voltage of a LC element of a pixel.

Thus, in accordance with examples described herein, a method and system may be provided for controlling a liquid crystal pulse width modulated display.

In a first aspect, a method for controlling a liquid crystal pulse width modulated display is provided. The method includes determining a desired number N of pulses of a unit duration over a repetition period, the repetition period consisting of a first number A of group periods, each group period consisting of a second number B of modulation intervals, and each modulation interval includes a third number (C−1) of unit durations followed by, for each modulation interval except a final modulation interval of a final group period, an additional unit duration. The method also includes such that the repetition period spans (A×B×C)−1 unit durations. The method also includes determining a group period baseline number of pulses D equal to the integer quotient of the Euclidean division of N by A. The method also includes determining a modulation interval baseline number of pulses H equal to the integer quotient of the Euclidean division of D by B. The method also includes determining a main segment modulation interval pattern consisting of H unit duration pulses at the first H unit durations of each modulation interval. The method also includes determining a repetition period remainder L2 equal to the integer remainder of the Euclidean division of N by A. The method also includes determining a group period remainder L equal to the integer remainder of the Euclidean division of D by B. The method also includes determining a baseline group period pattern consisting of the main segment modulation interval pattern applied to each modulation interval of the group period, and an additional L unit duration pulses allocated to a unit duration following the first H unit durations of each of L modulation intervals selected from the group period. The method also includes determining a repetition sequence for the repetition period consisting of the baseline group period pattern repeated for each group period of the repetition period, and an additional L2 unit duration pulses allocated to a unit duration following the first H unit durations of a final modulation interval of each of L2 group periods selected from the repetition period. The method also includes determining a desired number N of pulses of a unit duration over a repetition period, the repetition period consisting of determining a baseline group period pattern consisting of generating a drive sequence for controlling the liquid crystal pulse width modulated display, the drive sequence includes the repetition sequence repeated one or more times.

In some examples, the method may also include, in combination with the first aspect above, where the drive sequence further includes, prior to the repetition sequence repeated one or more times a pre-emphasis period of continuous drive.

In some examples, the method may also include, in combination with the first aspect and optionally with one or more of the examples above, where the unit duration is a least significant bit (LSB) duration.

In some examples, the method may also include, in combination with the first aspect and optionally with one or more of the examples above, where determining the desired number N of unit duration pulses over the repetition period includes receiving a grayscale value between a grayscale minimum and a grayscale maximum, and transforming the grayscale value into the desired number N, where a value of N=0 corresponds to the grayscale minimum and a value of N=(A×B×C)−1 corresponds to the grayscale maximum.

In some examples, the method may also include, in combination with the first aspect and optionally with one or more of the examples above, where A is 16, B is 8, C is 8, and N is encoded as a 10-bit value. Other technical features may be readily apparent to one skilled in the art from the following figures, descriptions, and claims.

In some examples, the method may also include, in combination with the first aspect and optionally with one or more of the examples above, where the pre-emphasis period has a duration determined based at least in part on a temperature of the liquid crystal pulse width modulated display.

In some examples, the method may also include, in combination with the first aspect and optionally with one or more of the examples above, where the L modulation intervals selected from the eight sequential modulation intervals of the group period are the first modulation interval when L is 1, the first and fifth modulation intervals when L is 2, the first, fourth, and seventh modulation intervals when L is 3, the first, third, fifth, and seventh modulation intervals when L is 4, the first, second, fourth, fifth, and seventh modulation intervals when L is 5, the first, second, third, fifth, sixth, and seventh modulation intervals when L is 6, and the first, second, third, fourth, fifth, sixth, and seventh modulation intervals when L is 7.

In some examples, the method may also include, in combination with the first aspect and optionally with one or more of the examples above, where the L2 group periods selected from the 16 sequential group periods of the repetition period are the first group period when L2 is 1, the first and ninth group periods when L2 is 2, the first, sixth, and ninth group periods when L2 is 3, the first, fourth, eighth, and twelfth group periods when L2 is 4, the first, fourth, eighth, eleventh, and fourteenth group periods when L2 is 5, the first, fourth, seventh, ninth, twelfth, and fifteenth group periods when L2 is 6, the first, third, fifth, eighth, tenth, twelfth, and fourteenth group periods when L2 is 7, the first, third, fifth, seventh, ninth, eleventh, thirteenth, and fifteenth group periods when L2 is 8, the first, third, fourth, sixth, eighth, tenth, twelfth, thirteenth, fifteenth group periods when L2 is 9, the first, third, fourth, sixth, eighth, ninth, eleventh, twelfth, thirteenth, fifteenth group periods when L2 is 10, the first, second, fourth, fifth, sixth, eighth, ninth, eleventh, twelfth, thirteenth, fifteenth group periods when L2 is 11, the first, second, third, fifth, sixth, seventh, ninth, tenth, eleventh, twelfth, fourteenth, fifteenth group periods when L2 is 12, the first, second, third, fourth, sixth, seventh, eighth, ninth, tenth, twelfth, thirteenth, fourteenth, fifteenth group periods when L2 is 13, the first, second, third, fourth, fifth, sixth, seventh, ninth, tenth, eleventh, twelfth, thirteenth, fourteenth, fifteenth group periods when L2 is 14, and the first, second, third, fourth, fifth, sixth, seventh, eighth, ninth, tenth, eleventh, twelfth, thirteenth, fourteenth, fifteenth group periods when L2 is 15.

In some examples, the method may also include, in combination with the first aspect and optionally with one or more of the examples above, further includes driving a pixel of the liquid crystal pulse width modulated display with the drive sequence, where the pixel includes one or more latches operable to store binary values of the drive sequence, where the drive sequence encodes the pre-emphasis period as a binary overdrive duration value. The method may also include where the pixel includes a pixel electrode includes a mirror element to reflect incoming light and drive a time-varying voltage across a liquid crystal element between the pixel electrode and a common electrode. The method may also include where the pixel includes a level shifter circuit configured to convert internal logic voltages to a higher voltage suitable for driving the liquid crystal element. The method may also include where the pixel includes logic operable to receive one or more timer signals and, based on the one or more timer signals during the pre-emphasis period, determined based on a comparison of the one or more timer signals to the binary overdrive duration value, provide an overdrive signal to the level shifter circuit, during each main segment modulation interval pattern of the drive sequence, provide a drive signal to the level shifter circuit, during each additional L unit duration pulse of the drive sequence, provide a drive signal to the level shifter circuit, and during each additional L2 unit duration pulse of the drive sequence, provide a drive signal to the level shifter circuit.

In some examples, the method may also include, in combination with the first aspect and optionally with one or more of the examples above, where the level shifter circuit includes an XOR logic function configured to invert a sense of the pixel electrode when inverting a sense of the common electrode voltage as controlled by a FLIP signal.

In a second aspect, a system for controlling a liquid crystal pulse width modulated display is provided, including a drive sequence generator configured to perform operations including receiving normalized grayscale data representative of a desired number N of unit duration pulses over a repetition period, the repetition period consisting of a first number A of group periods, each group period consisting of a second number B of modulation intervals, and each modulation interval includes a third number (C−1) of unit durations followed by, for each modulation interval except a final modulation interval of a final group period, an additional unit duration. The system also includes such that the repetition period spans (A×B×C)−1 unit durations. The system also includes determining a group period baseline number of pulses D equal to the integer quotient of the Euclidean division of N by A. The system also includes determining a modulation interval baseline number of pulses H equal to the integer quotient of the Euclidean division of D by B. The system also includes determining a main segment modulation interval pattern consisting of H unit duration pulses at the first H unit durations of each modulation interval. The system also includes determining a repetition period remainder L2 equal to the integer remainder of the Euclidean division of N by A. The system also includes determining a group period remainder L equal to the integer remainder of the Euclidean division of D by B. The system also includes determining a baseline group period pattern consisting of the main segment modulation interval pattern applied to each modulation interval of the group period, and an additional L unit duration pulses allocated to a unit duration following the first H unit durations of each of L modulation intervals selected from the group period. The system also includes determining a repetition sequence for the repetition period consisting of the baseline group period pattern repeated for each group period of the repetition period, and an additional L2 unit duration pulses allocated to a unit duration following the first H unit durations of a final modulation interval of each of L2 group periods selected from the repetition period. The system also includes receiving normalized grayscale data representative of a desired number N of unit duration pulses over a repetition period, the repetition period consisting of determining a baseline group period pattern consisting of generating a drive sequence for controlling the liquid crystal pulse width modulated display, the drive sequence includes the repetition sequence repeated one or more times.

In some examples, the system may also include, in combination with the second aspect above, a pre-emphasis driver configured to provide, prior to the repetition sequence repeated one or more times, a pre-emphasis period of continuous drive.

In some examples, the system may also include, in combination with the second aspect and optionally with one or more of the examples above, where the unit duration is a least significant bit (LSB) duration.

In some examples, the system may also include, in combination with the second aspect and optionally with one or more of the examples above, a grayscale normalizer configured to receive a grayscale value between a grayscale minimum and a grayscale maximum, and transforming the grayscale value into the desired number N, where a value of N=0 corresponds to the grayscale minimum and a value of N=(A×B×C)−1 corresponds to the grayscale maximum.

In some examples, the system may also include, in combination with the second aspect and optionally with one or more of the examples above, where A is 16, B is 8, C is 8, and N is encoded as a 10-bit value.

In some examples, the system may also include, in combination with the second aspect and optionally with one or more of the examples above, a pixel driver to drive a pixel of the liquid crystal pulse width modulated display with the drive sequence. The system may also include the pixel, includes one or more latches operable to store binary values of the drive sequence, where the drive sequence encodes the pre-emphasis period as a binary overdrive duration value.

The system may also include the pixel, includes a pixel electrode includes a mirror element to reflect incoming light and drive a time-varying voltage across a liquid crystal element between the pixel electrode and a common electrode. The system may also include the pixel, includes a level shifter circuit configured to convert internal logic voltages to a higher voltage suitable for driving the liquid crystal element. The system may also include the pixel, includes logic operable to receive one or more timer signals and, based on the one or more timer signals during the pre-emphasis period, determined based on a comparison of the one or more timer signals to the binary overdrive duration value, provide an overdrive signal to the level shifter circuit, during each main segment modulation interval pattern of the drive sequence, provide a drive signal to the level shifter circuit, during each additional L unit duration pulse of the drive sequence, provide a drive signal to the level shifter circuit, and during each additional L2 unit duration pulse of the drive sequence, provide a drive signal to the level shifter circuit. Other technical features may be readily apparent to one skilled in the art from the following figures, descriptions, and claims.

In some examples, the system may also include, in combination with the second aspect and optionally with one or more of the examples above, where the pre-emphasis period has a duration determined based at least in part on a temperature of the liquid crystal pulse width modulated display.

In some examples, the system may also include, in combination with the second aspect and optionally with one or more of the examples above, where the L modulation intervals selected from the eight sequential modulation intervals of the group period are the first modulation interval when L is 1, the first and fifth modulation intervals when L is 2, the first, fourth, and seventh modulation intervals when L is 3, the first, third, fifth, and seventh modulation intervals when L is 4, the first, second, fourth, fifth, and seventh modulation intervals when L is 5, the first, second, third, fifth, sixth, and seventh modulation intervals when L is 6, and the first, second, third, fourth, fifth, sixth, and seventh modulation intervals when L is 7.

In some examples, the system may also include, in combination with the second aspect and optionally with one or more of the examples above, where the L2 group periods selected from the 16 sequential group periods of the repetition period are the first group period when L2 is 1, the first and ninth group periods when L2 is 2, the first, sixth, and ninth group periods when L2 is 3, the first, fourth, eighth, and twelfth group periods when L2 is 4, the first, fourth, eighth, eleventh, and fourteenth group periods when L2 is 5, the first, fourth, seventh, ninth, twelfth, and fifteenth group periods when L2 is 6, the first, third, fifth, eighth, tenth, twelfth, and fourteenth group periods when L2 is 7, the first, third, fifth, seventh, ninth, eleventh, thirteenth, and fifteenth group periods when L2 is 8, the first, third, fourth, sixth, eighth, tenth, twelfth, thirteenth, fifteenth group periods when L2 is 9, the first, third, fourth, sixth, eighth, ninth, eleventh, twelfth, thirteenth, fifteenth group periods when L2 is 10, the first, second, fourth, fifth, sixth, eighth, ninth, eleventh, twelfth, thirteenth, fifteenth group periods when L2 is 11, the first, second, third, fifth, sixth, seventh, ninth, tenth, eleventh, twelfth, fourteenth, fifteenth group periods when L2 is 12, the first, second, third, fourth, sixth, seventh, eighth, ninth, tenth, twelfth, thirteenth, fourteenth, fifteenth group periods when L2 is 13, the first, second, third, fourth, fifth, sixth, seventh, ninth, tenth, eleventh, twelfth, thirteenth, fourteenth, fifteenth group periods when L2 is 14, and the first, second, third, fourth, fifth, sixth, seventh, eighth, ninth, tenth, eleventh, twelfth, thirteenth, fourteenth, fifteenth group periods when L2 is 15.

In some examples, the system may also include, in combination with the second aspect and optionally with one or more of the examples above, where the level shifter circuit includes an XOR logic function configured to invert a sense of the pixel electrode when inverting a sense of the common electrode voltage as controlled by a FLIP signal. Other technical features may be readily apparent to one skilled in the art from the following figures, descriptions, and claims.

It will be appreciated that the various aspects of the methods and systems described above may be combined in various combination or sub-combinations.

Glossary

"Euclidean division" or "division with remainder" refers to a process of dividing an integer dividend by an integer divisor to produce an integer quotient and a natural number remainder, the remainder being smaller than the divisor, and the dividend being equal to the divisor times the quotient, plus the remainder.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method for controlling a liquid crystal pulse width modulated display, the method comprising:

- determining a desired number N of pulses of a unit duration over a repetition period, the repetition period consisting of:
  - a first number A of group periods;
  - each group period consisting of a second number B of modulation intervals; and
  - each modulation interval comprising a third number (C−1) of unit durations followed by, for each modulation interval except a final modulation interval of a final group period, an additional unit duration;
  - such that the repetition period spans (A×B×C)−1 unit durations;
- determining a group period baseline number of pulses D equal to an integer quotient of a Euclidean division of N by A;

determining a modulation interval baseline number of pulses H equal to an integer quotient of a Euclidean division of D by B;

determining a main segment modulation interval pattern consisting of H unit duration pulses at the first H unit durations of each modulation interval;

determining a repetition period remainder L2 equal to the integer remainder of the Euclidean division of N by A;

determining a group period remainder L equal to the integer remainder of the Euclidean division of D by B;

determining a baseline group period pattern consisting of:

the main segment modulation interval pattern applied to each modulation interval of the group period; and an additional L unit duration pulses allocated to a unit duration following the first H unit durations of each of L modulation intervals selected from the group period; and determining a repetition sequence for the repetition period consisting of:

the baseline group period pattern repeated for each group period of the repetition period; and an additional L2 unit duration pulses allocated to a unit duration following the first H unit durations of a final modulation interval of each of L2 group periods selected from the repetition period; and generating a drive sequence for controlling the liquid crystal pulse width modulated display, the drive sequence comprising the repetition sequence repeated one or more times.

2. The method of claim 1, wherein:

the drive sequence further comprises, prior to the repetition sequence repeated one or more times:

a pre-emphasis period of continuous drive.

3. The method of claim 2, wherein:

the pre-emphasis period has a duration determined based at least in part on a temperature of the liquid crystal pulse width modulated display.

4. The method of claim 1, wherein:

the unit duration is a least significant bit (LSB) duration.

5. The method of claim 1, wherein:

determining the desired number N of unit duration pulses over the repetition period comprises:

receiving a grayscale value between a grayscale minimum and a grayscale maximum; and transforming the grayscale value into the desired number N, wherein a value of N=0 corresponds to the grayscale minimum and a value of $N=(A\times B\times C)-1$ corresponds to the grayscale maximum.

6. The method of claim 1, wherein:

A is 16;

B is 8;

C is 8; and

N is encoded as a 10-bit value.

7. The method of claim 6, wherein:

the L modulation intervals selected from the eight sequential modulation intervals of the group period are:

the first modulation interval when L is 1;

the first and fifth modulation intervals when L is 2;

the first, fourth, and seventh modulation intervals when Lis 3;

the first, third, fifth, and seventh modulation intervals when L is 4;

the first, second, fourth, fifth, and seventh modulation intervals when Lis 5;

the first, second, third, fifth, sixth, and seventh modulation intervals when Lis 6; and the first, second, third, fourth, fifth, sixth, and seventh modulation intervals when L is 7.

8. The method of claim 7, wherein:

the L2 group periods selected from the 16 sequential group periods of the repetition period are:

the first group period when L2 is 1;

the first and ninth group periods when L2 is 2;

the first, sixth, and ninth group periods when L2 is 3;

the first, fourth, eighth, and twelfth group periods when L2 is 4;

the first, fourth, eighth, eleventh, and fourteenth group periods when L2 is 5;

the first, fourth, seventh, ninth, twelfth, and fifteenth group periods when L2 is 6;

the first, third, fifth, eighth, tenth, twelfth, and fourteenth group periods when L2 is 7;

the first, third, fifth, seventh, ninth, eleventh, thirteenth, and fifteenth group periods when L2 is 8;

the first, third, fourth, sixth, eighth, tenth, twelfth, thirteenth, fifteenth group periods when L2 is 9;

the first, third, fourth, sixth, eighth, ninth, eleventh, twelfth, thirteenth, fifteenth group periods when L2 is 10;

the first, second, fourth, fifth, sixth, eighth, ninth, eleventh, twelfth, thirteenth, fifteenth group periods when L2 is 11;

the first, second, third, fifth, sixth, seventh, ninth, tenth, eleventh, twelfth, fourteenth, fifteenth group periods when L2 is 12;

the first, second, third, fourth, sixth, seventh, eighth, ninth, tenth, twelfth, thirteenth, fourteenth, fifteenth group periods when L2 is 13;

the first, second, third, fourth, fifth, sixth, seventh, ninth, tenth, eleventh, twelfth, thirteenth, fourteenth, fifteenth group periods when L2 is 14; and the first, second, third, fourth, fifth, sixth, seventh, eighth, ninth, tenth, eleventh, twelfth, thirteenth, fourteenth, fifteenth group periods when L2 is 15.

9. The method of claim 2, further comprising:

driving a pixel of the liquid crystal pulse width modulated display with the drive sequence, wherein the pixel comprises:

one or more latches operable to store binary values of the drive sequence, wherein the drive sequence encodes the pre-emphasis period as a binary overdrive duration value;

a pixel electrode comprising a mirror element to reflect incoming light and drive a time-varying voltage across a liquid crystal element between the pixel electrode and a common electrode;

a level shifter circuit configured to convert internal logic voltages to a higher voltage suitable for driving the liquid crystal element; and logic operable to receive one or more timer signals and, based on the one or more timer signals:

during the pre-emphasis period, determined based on a comparison of the one or more timer signals to the binary overdrive duration value, provide an overdrive signal to the level shifter circuit;

during each main segment modulation interval pattern of the drive sequence, provide a drive signal to the level shifter circuit;

during each additional L unit duration pulse of the drive sequence, provide a drive signal to the level shifter circuit; and during each additional L2 unit duration pulse of the drive sequence, provide a drive signal to the level shifter circuit.

10. The method of claim 9, wherein:

the level shifter circuit comprises an XOR logic function configured to invert a sense of the pixel electrode when inverting a sense of the common electrode voltage as controlled by a FLIP signal.

11. A system for controlling a liquid crystal pulse width modulated display, comprising a drive sequence generator configured to perform operations including:

receiving normalized grayscale data representative of a desired number N of unit duration pulses over a repetition period, the repetition period consisting of:

a first number A of group periods;

each group period consisting of a second number B of modulation intervals; and each modulation interval comprising a third number (C−1) of unit durations followed by, for each modulation interval except a final modulation interval of a final group period, an additional unit duration;

such that the repetition period spans (A×B×C)−1 unit durations;

determining a group period baseline number of pulses D equal to the integer quotient of the Euclidean division of N by A;

determining a modulation interval baseline number of pulses H equal to the integer quotient of the Euclidean division of D by B;

determining a main segment modulation interval pattern consisting of H unit duration pulses at the first H unit durations of each modulation interval;

determining a repetition period remainder L2 equal to the integer remainder of the Euclidean division of N by A;

determining a group period remainder L equal to the integer remainder of the Euclidean division of D by B;

determining a baseline group period pattern consisting of:

the main segment modulation interval pattern applied to each modulation interval of the group period; and an additional L unit duration pulses allocated to a unit duration following the first H unit durations of each of L modulation intervals selected from the group period; and determining a repetition sequence for the repetition period consisting of:

the baseline group period pattern repeated for each group period of the repetition period; and an additional L2 unit duration pulses allocated to a unit duration following the first H unit durations of a final modulation interval of each of L2 group periods selected from the repetition period; and generating a drive sequence for controlling the liquid crystal pulse width modulated display, the drive sequence comprising the repetition sequence repeated one or more times.

12. The system of claim 11, further comprising:

a pre-emphasis driver configured to provide, prior to the repetition sequence repeated one or more times, a pre-emphasis period of continuous drive.

13. The system of claim 12, wherein:

the pre-emphasis period has a duration determined based at least in part on a temperature of the liquid crystal pulse width modulated display.

14. The system of claim 11, wherein:

the unit duration is a least significant bit (LSB) duration.

15. The system of claim 11, further comprising:

a grayscale normalizer configured to:

receive a grayscale value between a grayscale minimum and a grayscale maximum; and transforming the grayscale value into the desired number N, wherein a value of N=0 corresponds to the grayscale minimum and a value of N=(A×B×C)−1 corresponds to the grayscale maximum.

16. The system of claim 11, wherein:

A is 16;

B is 8;

C is 8; and

N is encoded as a 10-bit value.

17. The system of claim 16, wherein:

the L modulation intervals selected from the eight sequential modulation intervals of the group period are:

the first modulation interval when L is 1;

the first and fifth modulation intervals when L is 2;

the first, fourth, and seventh modulation intervals when L is 3;

the first, third, fifth, and seventh modulation intervals when L is 4;

the first, second, fourth, fifth, and seventh modulation intervals when L is 5;

the first, second, third, fifth, sixth, and seventh modulation intervals when L is 6; and the first, second, third, fourth, fifth, sixth, and seventh modulation intervals when L is 7.

18. The system of claim 17, wherein:

the L2 group periods selected from the 16 sequential group periods of the repetition period are:

the first group period when L2 is 1;

the first and ninth group periods when L2 is 2;

the first, sixth, and ninth group periods when L2 is 3;

the first, fourth, eighth, and twelfth group periods when L2 is 4;

the first, fourth, eighth, eleventh, and fourteenth group periods when L2 is 5;

the first, fourth, seventh, ninth, twelfth, and fifteenth group periods when L2 is 6;

the first, third, fifth, eighth, tenth, twelfth, and fourteenth group periods when L2 is 7;

the first, third, fifth, seventh, ninth, eleventh, thirteenth, and fifteenth group periods when L2 is 8;

the first, third, fourth, sixth, eighth, tenth, twelfth, thirteenth, fifteenth group periods when L2 is 9;

the first, third, fourth, sixth, eighth, ninth, eleventh, twelfth, thirteenth, fifteenth group periods when L2 is 10;

the first, second, fourth, fifth, sixth, eighth, ninth, eleventh, twelfth, thirteenth, fifteenth group periods when L2 is 11;

the first, second, third, fifth, sixth, seventh, ninth, tenth, eleventh, twelfth, fourteenth, fifteenth group periods when L2 is 12;

the first, second, third, fourth, sixth, seventh, eighth, ninth, tenth, twelfth, thirteenth, fourteenth, fifteenth group periods when L2 is 13;

the first, second, third, fourth, fifth, sixth, seventh, ninth, tenth, eleventh, twelfth, thirteenth, fourteenth, fifteenth group periods when L2 is 14; and the first, second, third, fourth, fifth, sixth, seventh, eighth, ninth, tenth, eleventh, twelfth, thirteenth, fourteenth, fifteenth group periods when L2 is 15.

19. The system of claim 12, further comprising:

a pixel driver to drive a pixel of the liquid crystal pulse width modulated display with the drive sequence; and the pixel, comprising:

one or more latches operable to store binary values of the drive sequence, wherein the drive sequence encodes the pre-emphasis period as a binary overdrive duration value;

a pixel electrode comprising a mirror element to reflect incoming light and drive a time-varying voltage across a liquid crystal element between the pixel electrode and a common electrode;

a level shifter circuit configured to convert internal logic voltages to a higher voltage suitable for driving the liquid crystal element; and logic operable to receive one or more timer signals and, based on the one or more timer signals:

during the pre-emphasis period, determined based on a comparison of the one or more timer signals to the binary overdrive duration value, provide an overdrive signal to the level shifter circuit;

during each main segment modulation interval pattern of the drive sequence, provide a drive signal to the level shifter circuit;

during each additional L unit duration pulse of the drive sequence, provide a drive signal to the level shifter circuit; and during each additional L2 unit duration pulse of the drive sequence, provide a drive signal to the level shifter circuit.

20. The system of claim 19, wherein:

the level shifter circuit comprises an XOR logic function configured to invert a sense of the pixel electrode when inverting a sense of the common electrode voltage as controlled by a FLIP signal.

* * * * *